US008117177B2

(12) United States Patent
Suzuki et al.

(10) Patent No.: US 8,117,177 B2
(45) Date of Patent: Feb. 14, 2012

(54) APPARATUS AND METHOD FOR SEARCHING INFORMATION BASED ON CHARACTER STRINGS IN DOCUMENTS

(75) Inventors: Masaru Suzuki, Kanagawa (JP); Yasuto Ishitani, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 454 days.

(21) Appl. No.: 12/043,232

(22) Filed: Mar. 6, 2008

(65) Prior Publication Data

US 2008/0243791 A1      Oct. 2, 2008

(30) Foreign Application Priority Data

Mar. 29, 2007   (JP) .................................. 2007-087384

(51) Int. Cl.
  *G06F 7/00* (2006.01)
(52) U.S. Cl. ....................................... 707/706; 707/758
(58) Field of Classification Search .................. 707/706, 707/711, 739–741, 758, 776
See application file for complete search history.

(56) References Cited

U.S. PATENT DOCUMENTS

| 5,311,429 | A | * | 5/1994 | Tominaga | 704/10 |
| 5,579,224 | A | * | 11/1996 | Hirakawa et al. | 704/2 |
| 5,608,623 | A | * | 3/1997 | Sata et al. | 704/4 |
| 5,907,841 | A | * | 5/1999 | Sumita et al. | 1/1 |
| 5,960,384 | A | * | 9/1999 | Brash | 704/9 |
| 6,098,034 | A | * | 8/2000 | Razin et al. | 704/9 |
| 6,912,536 | B1 | * | 6/2005 | Ochitani | 707/737 |
| 7,246,107 | B2 | * | 7/2007 | Nakamura et al. | 707/711 |
| 7,836,065 | B2 | * | 11/2010 | Hackmann | 707/758 |
| 2001/0003183 | A1 | * | 6/2001 | Thompson et al. | 707/3 |
| 2004/0049499 | A1 | * | 3/2004 | Nomoto et al. | 707/3 |
| 2006/0080276 | A1 | | 4/2006 | Suzuki et al. | |
| 2006/0287919 | A1 | * | 12/2006 | Rubens et al. | 705/14 |
| 2007/0143693 | A1 | * | 6/2007 | Choi et al. | 715/753 |

FOREIGN PATENT DOCUMENTS

| JP | 2006-65754 | 3/2006 |
| JP | 2008-243047 | 10/2008 |
| WO | WO 2006/009366 A1 | 1/2006 |

OTHER PUBLICATIONS

Notice of Rejection issued by the Japanese Patent Office on Jun. 17, 2009, for Japanese Patent Application No. 2007-087384, and English-language translation thereof.
Ishitani et al., "Interactive human interface for information retrieval based on semantic pattern analysis and intension understanding," IEICE Technical Report (Mar. 15, 2007), 106:7-12.

* cited by examiner

*Primary Examiner* — Robert Timblin
(74) *Attorney, Agent, or Firm* — Finnegan, Henderson, Farabow, Garrett & Dunner, L.L.P.

(57) ABSTRACT

An information searching apparatus stores, in a character-string accumulating unit, first character strings in correspondence with second character strings while classifying each of the second character strings according to an attribute thereof. The information searching apparatus further stores, in a storage unit, the attributes in correspondence with specified information each of which is specified based on at least one of the corresponding first character string and the containing document. The information searching apparatus obtains specified information based on at least one of a first character string and a document that contains the first character string and extracts, from the storage unit, the attributes. The information searching apparatus then extracts, from the character-string accumulating unit, one of the second character strings.

12 Claims, 18 Drawing Sheets

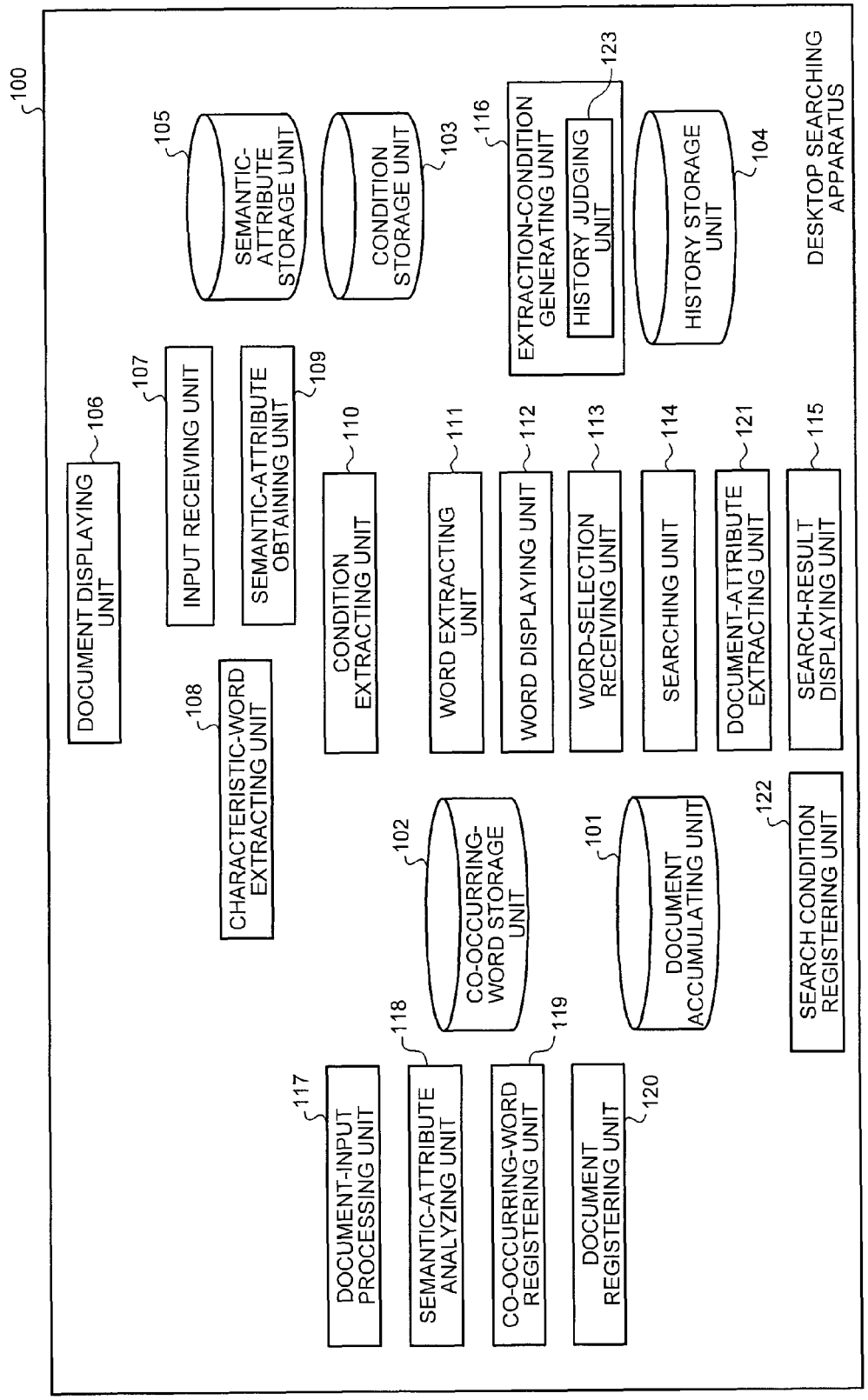

FIG.2

|  | NAME OF PERSON | NAME OF PLACE | NAME OF COMPANY | NAME OF ORGANIZATION | NAME OF FACILITY | DATE |
|---|---|---|---|---|---|---|
| TOZAI INSURANCE CO., LTD. | ONO NAKAMURA | CHIYODA KAWASAKI | NANBOKU ELECTRONICS | RESEARCH AND DEVELOPMENT CENTER | TOZAI INSURANCE KAWASAKI BRANCH TOZAI HEADQUARTER BUILDING | JULY 20, 2006 AUGUST 22, 2006 |
| EMS | ONO | KAWASAKI | TOZAI INSURANCE CO., LTD. NANBOKU ELECTRONICS | RESEARCH AND DEVELOPMENT CENTER | TOZAI INSURANCE KAWASAKI BRANCH | JULY 20, 2006 |
| WORKFLOW | NAKAMURA | CHIYODA | TOZAI INSURANCE CO., LTD. NANBOKU ELECTRONICS | RESEARCH AND DEVELOPMENT CENTER | TOZAI INSURANCE HEADQUARTER BUILDING | AUGUST 22, 2006 |
| .. | .. | .. | .. | .. | .. | .. |

FIG.3

| SEMANTIC ATTRIBUTE OF KEYWORD | CHARACTERISTIC WORD | SEMANTIC ATTRIBUTE OF ADDITIONAL KEYWORD | ATTRIBUTE INFORMATION USED IN NARROWING-DOWN PROCESS DURING SEARCH | FILE FORMAT | CREATOR OR SENDER/ RECEIVER | DATE CREATED OR SENT/ RECEIVED |
|---|---|---|---|---|---|---|
| NAME OF COMPANY | SCHEDULE | NAME OF FACILITY | FILE FORMAT | PRESENTATION | — | — |
| NAME OF PLACE | HEADQUARTER | NAME OF FACILITY | FILE FORMAT | DOCUMENT | — | — |
| .. | .. | .. | .. | .. | .. | .. |

| PATTERN | SEMANTIC ATTRIBUTE |
|---|---|
| ([^HIRAGANA A TO N]+) CO., LTD. | NAME OF COMPANY |
| ([^KATAKANA A TO N]+) CO., LTD. | NAME OF COMPANY |
| ([A-Z]+) Inc | NAME OF COMPANY |
| ([A-Z][a-z]+) Inc | NAME OF COMPANY |
| ([A-Z]+) Corp | NAME OF COMPANY |
| ([A-Z][a-z]+) Corp | NAME OF COMPANY |
| $NAME OF COMPANY$ 「([^」 ]+)」 | NAME OF PRODUCT |
| 「([^」 ]+)」 ¥($NAME OF COMPANY$¥) | NAME OF PRODUCT |

| KEYWORD | SEMANTIC ATTRIBUTE OF KEYWORD | SEMANTIC ATTRIBUTE OF ADDITIONAL KEYWORD | SELECTED ATTRIBUTE INFORMATION | FILE FORMAT | CREATOR OR SENDER/RECEIVER | DATE CREATED OR SENT/RECEIVED | CHARACTERISTIC WORDS IN ORIGINAL DOCUMENT |
|---|---|---|---|---|---|---|---|
| TOZAI INSURANCE CO., LTD. | NAME OF COMPANY | NAME OF FACILITY | FILE FORMAT | PRESENTATION | TARO SATO | ONE MONTH AGO | SCHEDULE, VISIT, PLANNING — 501 |
| NANBOKU ELECTRONICS | NAME OF COMPANY | NAME OF FACILITY | FILE FORMAT | PRESENTATION | HIROSHI TANAKA | ONE MONTH AGO | SCHEDULE, BUSINESS TRIP — 502 |
| .. | .. | .. | .. | .. | .. | .. | .. |

FIG.7

| WEEKLY SCHEDULE | | | |
|---|---|---|---|
| | 8/3 (THU) | 8/4 (FRI) | 8/5 (SAT) |
| TAKESHI TAKAHASHI | TOZAI INSURANCE CO., LTD. - VISIT | PLANNING MEETING | |

FIG.8

| WEEKLY SCHEDULE | | | |
|---|---|---|---|
| | 8/3 (THU) | 8/4 (FRI) | 8/5 (SAT) |
| TAKESHI TAKAHASHI | TOZAI INSURANCE CO., LTD. - VISIT | PLANNING MEETING | |

FIG.9

| WEEKLY SCHEDULE | | | |
|---|---|---|---|
| | 8/3 (THU) | 8/4 (FRI) | 8/5 (SAT) |
| TAKESHI TAKAHASHI | TOZAI INSURANCE CO., LTD. - VISIT | PLANNING | |

SEMANTIC ATTRIBUTES THAT CO-OCCUR WITH "TOZAI INSURANCE CO., LTD."
NAME OF FACILITY
  TOZAI HEADQUARTER BUILDING
  TOZAI INSURANCE KAWASAKI BRANCH

FIG.10

| WEEKLY SCHEDULE | | | |
|---|---|---|---|
| | 8/3 (THU) | 8/4 (FRI) | 8/5 (SAT) |
| TAKESHI TAKAHASHI | TOZAI INSURANCE CO., LTD. - VISIT | PLANNING | |

SEMANTIC ATTRIBUTES THAT CO-OCCUR WITH "TOZAI INSURANCE CO., LTD."
NAME OF FACILITY
TOZAI HEADQUARTER BUILDING
TOZAI INSURANCE KAWASAKI BRANCH

DATE CREATED OR SENT/RECEIVED
LESS THAN A WEEK AGO
LESS THAN A MONTH AGO
ONE MONTH AGO OR BEFORE
CREATOR OR SENDER/RECIPIENT
TAKEO SATO
MITSUKO TANAKA
TADAO KATO

EMS SYSTEM PROPOSAL.ppt
WORKFLOW SYSTEM PROPOSAL.ppt

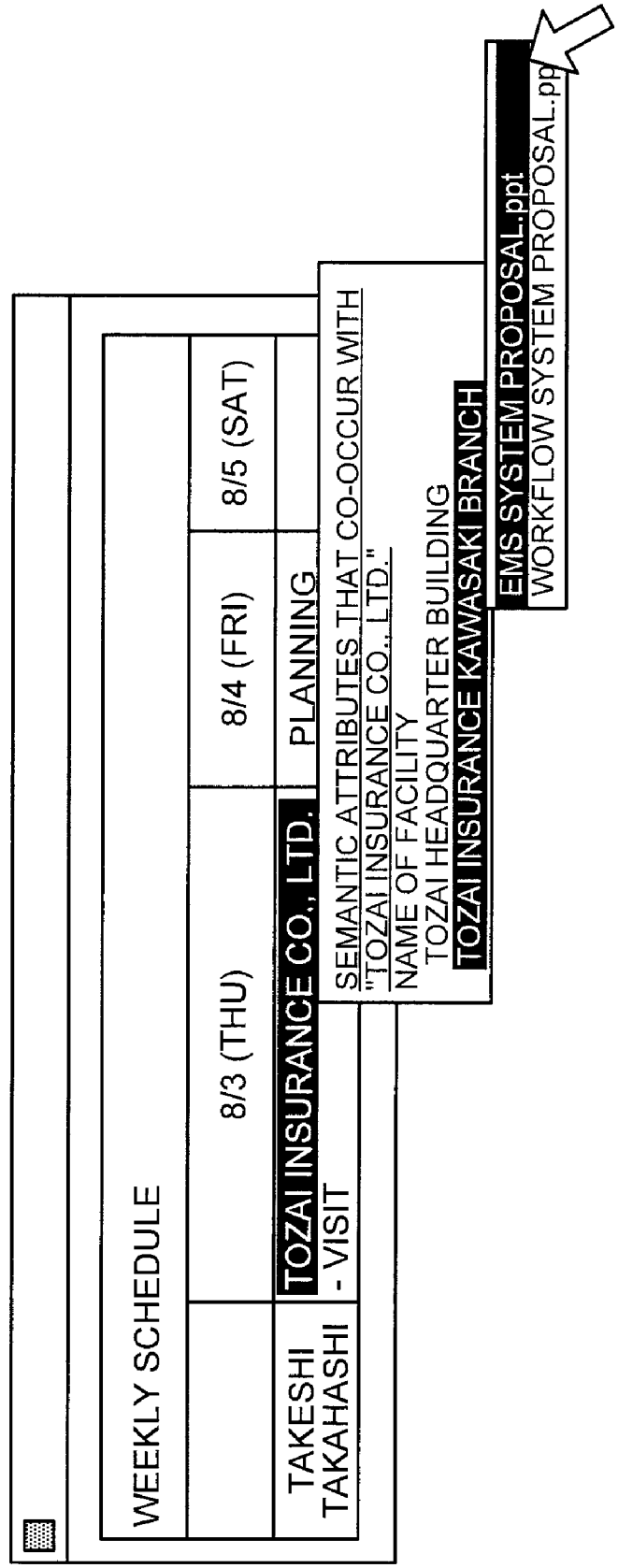

FIG.14

SEMANTIC ATTRIBUTES THAT CO-OCCUR WITH "TOZAI INSURANCE CO., LTD."
NAME OF PLACE
   CHIYODA
   KAWASAKI
NAME OF FACILITY
   TOZAI HEADQUARTER BUILDING
   TOZAI INSURANCE KAWASAKI BRANCH
   CREATOR/SENDER
     HANAKO SUZUKI
     TAKEO SATO
     MITSUKO TANAKA
     TADAO KATO
   DATE CREATED/SENT
     YESTERDAY
     LESS THAN A WEEK AGO
     LESS THAN A MONTH AGO
     ONE MONTH AGO OR BEFORE
   FILE FORMAT
     PRESENTATION 
     SPREADSHEET
     DOCUMENT
     E-MAIL
  NAME OF PERSON
   ONO
   NAKAMURA
   KOIKE
NAME OF ORGANIZATION
   RESEARCH AND DEVELOPMENT CENTER
DATE
   JULY 20, 2006
   AUGUST 22, 2006

FIG.15

SEMANTIC ATTRIBUTES THAT CO-OCCUR WITH "TOZAI INSURANCE CO., LTD."
NAME OF PLACE
    CHIYODA
    KAWASAKI
NAME OF FACILITY
    TOZAI HEADQUARTER BUILDING
    TOZAI INSURANCE KAWASAKI BRANCH
CREATOR/SENDER
    TARO SATO
    ICHIRO TANAKA
    HANAKO SUZUKI
DATE CREATED/SENT
    YESTERDAY
    LESS THAN A WEEK AGO
    LESS THAN A MONTH AGO
    ONE MONTH AGO OR BEFORE
FILE FORMAT
    PRESENTATION
    PRESENTATION
    EMS SYSTEM PROPOSAL.ppt
    SPREADSHEET
    DOCUMENT
    E-MAIL

FIG.18

| SEMANTIC ATTRIBUTE OF KEYWORD: | NAME OF COMPANY |
|---|---|
| CHARACTERISTIC WORD IN ORIGINAL DOCUMENT: | SCHEDULE |

| SEMANTIC ATTRIBUTE OF ADDITIONAL KEYWORD: | NAME OF FACILITY |
|---|---|
| ATTRIBUTE INFORMATION USED IN NARROWING-DOWN PROCESS DURING SEARCH: | FILE FORMAT |

| FILE FORMAT: | PRESENTATION |
|---|---|
| CREATOR OR SENDER/RECEIVER: | |
| DATE CREATED OR SENT/RECEIVED: | ONE MONTH AGO |

FIG.19

| NAME OF SEARCHING METHOD: | NEW SEARCHING METHOD | 1901 |
|---|---|---|

| SEMANTIC ATTRIBUTE OF KEYWORD: | NAME OF COMPANY |
|---|---|
| CHARACTERISTIC WORD IN ORIGINAL DOCUMENT: | SCHEDULE |

| SEMANTIC ATTRIBUTE OF ADDITIONAL KEYWORD: | NAME OF FACILITY |
|---|---|
| ATTRIBUTE INFORMATION USED IN NARROWING-DOWN PROCESS DURING SEARCH: | FILE FORMAT |

| FILE FORMAT: | PRESENTATION |
|---|---|
| CREATOR OR SENDER/RECEIVER: | |
| DATE CREATED OR SENT/RECEIVED: | ONE MONTH AGO — 1902 |

REGISTER   DELETE

APPARATUS AND METHOD FOR SEARCHING INFORMATION BASED ON CHARACTER STRINGS IN DOCUMENTS

CROSS-REFERENCE TO RELATED APPLICATIONS

This application is based upon and claims the benefit of priority from the prior Japanese Patent Application No. 2007-87384, filed on Mar. 29, 2007; the entire contents of which are incorporated herein by reference.

BACKGROUND OF THE INVENTION

1. Field of the Invention

The present invention relates to an information searching apparatus that conducts a search for a document as well as a method and a computer program product therefor.

2. Description of the Related Art

In recent years, many techniques used for conducting a search in a recording medium have been proposed due to developments in computer technology and increases in the capacity of recording media used in computers. For instance, examples of techniques for conducting a search with a terminal device that is used by users on a daily basis includes a technique called a desktop search technique.

By using the desktop search technique, it is possible to search for a specific document from among a group of documents that are recorded on a storage medium such as a hard disk within a terminal device such as a personal computer (PC). When conducting a search for a document, the user is able to specify, as a search condition, not only a keyword contained in the document, but also attribute information such as the file format of the document (e.g., e-mail, word processor, spreadsheet, presentation, etc.), the date on which the document was created, the date on which the document was updated, the creator of the document, the date on which the document was sent/received as an e-mail message, and the sender/receiver of the e-mail message. By using the desktop search technique, the user is able to conduct a search for a desired document within the terminal device.

When conducting a desktop search, if a large number of documents are stored in a storage medium being a search target in which the search is to be conducted, the user needs to specify an appropriate keyword and/or appropriate attribute information as the search condition. In a case where the user fails to specify an appropriate keyword and/or appropriate attribute information, a large number of documents will be output as a search result. This situation sometimes makes it difficult to find the desired document.

Also, with regard to the output of a search result, the desktop search is not able to use a technique used by a web search by which documents having higher levels of reliability are output in higher ranks based on a link relation with other documents (for example, a page rank algorithm used by a search engine). Thus, in a desktop search, the document desired by the user will not necessarily be output in a higher rank of a search result. Consequently, the user needs to look for the desired document from among the documents in the output search result. In this situation, the user needs to spend a lot of time going through the search result.

To avoid this problem, the user needs to specify an appropriate keyword and/or appropriate attribute information as the search condition. Thus, it takes a lot of trouble and time to specify the search condition. In addition, in order for the user to come up with and specify an appropriate search condition, the user is required to know, in detail, the attribute information that he/she is able to use. Thus, in a case where the user is not familiar with conducting searches, it takes even more trouble and time for the user to specify the search condition.

Incidentally, a technique for determining a user's intention based on the contents of a specified word has been proposed. It may seem that it is possible to specify a more appropriate search condition by using the user's intention that is determined based on the contents of the specified word. An example of the technique for determining a user's intention based on the contents of a specified word is disclosed in, for example, JP-A 2006-65754 (KOKAI).

According to the technique disclosed in JP-A 2006-65754 (KOKAI), a dictionary related to words is provided. By using the dictionary, attribute information is appended to each of words that are contained in a document, the attribute information representing the meaning of the corresponding word. When the user has selected one of the words, it is possible to analyze the contents of the word specified by the user, based on the attribute information appended to the word.

However, the technique disclosed in JP-A 2006-65754 (KOKAI) is for analyzing the intention of an action taken by the user and is not for specifying a search condition used for conducting a search for a document. Thus, it is difficult to apply this technique to the specifying of the search condition.

SUMMARY OF THE INVENTION

According to one aspect of the present invention, an information searching apparatus includes a document accumulating unit that accumulates documents; a character-string accumulating unit that accumulates first character strings contained in any of the documents and used as a search key, second character strings contained in the same one of the documents as that includes the first character strings, and attributes that are obtained by abstracting the second character strings and correspond the first character strings and the second character strings one another; a storage unit that preliminarily stores the attributes and specified information in correspondence with one another, the specified information being specified from at least one of the first character strings and the document; an input receiving unit that receives an input of a first character string; an obtaining unit that obtains specified information from at least one of the first character string an input of which is received by the input receiving unit and the documents that contains the first character string; an attribute extracting unit that extracts, from the condition storage unit, one of the attributes that is in correspondence with the specified information obtained by the obtaining unit; a character-string extracting unit that extracts, from the character-string accumulating unit, one of the second character strings that is in correspondence with the first character string an input of which is received by the input receiving unit and the attribute extracted by the attribute extracting unit; and a searching unit that searches for one of the documents that contains both the first character string an input of which is received by the input receiving unit and the second character string extracted by the character-string extracting unit, from the document accumulating unit.

According to another aspect of the present invention, an information searching method includes accumulating documents in a document accumulating unit; accumulating in a character-string accumulating unit, first character strings contained in any of the documents and used as a search key, second character strings contained in the same one of the documents as that includes the first character strings, and attributes that are obtained by abstracting the second character strings and correspond the first character strings and the second character strings one another; storing in a storage unit preliminarily, the attributes and specified information in correspondence with one another, the specified information being specified from at least one of the first character strings and the document; receiving an input of a first character string; obtaining specified information from at least one of the first character string input in the receiving and the documents containing the first character string; extracting from the storage unit, one of the attributes that is in correspondence with the specified information obtained in the obtaining; extracting from the character-string accumulating unit, one of the second character strings that is in correspondence with the first character string an input of which is received in the receiving and the attribute extracted in the extracting; and searching for one of the documents that contains both the first character string an input of which is received in the receiving and the second character string extracted in the character-string extracting, from the document accumulating unit.

A computer program product according to still another aspect of the present invention causes a computer to perform the method according to the present invention.

BRIEF DESCRIPTION OF THE DRAWINGS

FIG. 1 is a block diagram of a desktop searching apparatus according to a first embodiment of the present invention;

FIG. 2 is a diagram for explaining a structure of a co-occurrence relationship storing table that is stored in a co-occurring-word accumulating unit;

FIG. 3 is a diagram for explaining a structure of a generalized search condition storing table stored in a condition storage unit;

FIG. 4 is a diagram for explaining a structure of a semantic attribute correspondence table;

FIG. 5 is a diagram for explaining a structure of a history storing table;

FIG. 7 is a diagram for illustrating an example of a document displayed by a document displaying unit;

FIG. 8 is a diagram for explaining a situation in which a keyword is selected with a pointing device, out of the document displayed by the document displaying unit;

FIG. 9 is a diagram for illustrating an example in which words are displayed by a word displaying unit;

FIG. 10 is a diagram for illustrating examples of types of attributes that are displayed by a search-result displaying unit;

FIG. 11 is a diagram for illustrating an example in which document names are displayed by the search-result displaying unit in a case where a searching unit has detected only two documents;

FIG. 14 is a diagram for illustrating examples of types of attributes that are displayed by the search-result displaying unit;

FIG. 15 is a diagram for illustrating examples of document names that are displayed by the search-result displaying unit;

FIG. 18 is a diagram for illustrating an example of a generalized search condition that has been newly generated by an information generating unit;

FIG. 19 is a diagram for illustrating an example of a user interface used for correcting a generalized search condition generated by the information generating unit;

DETAILED DESCRIPTION OF THE INVENTION

Figure 6:
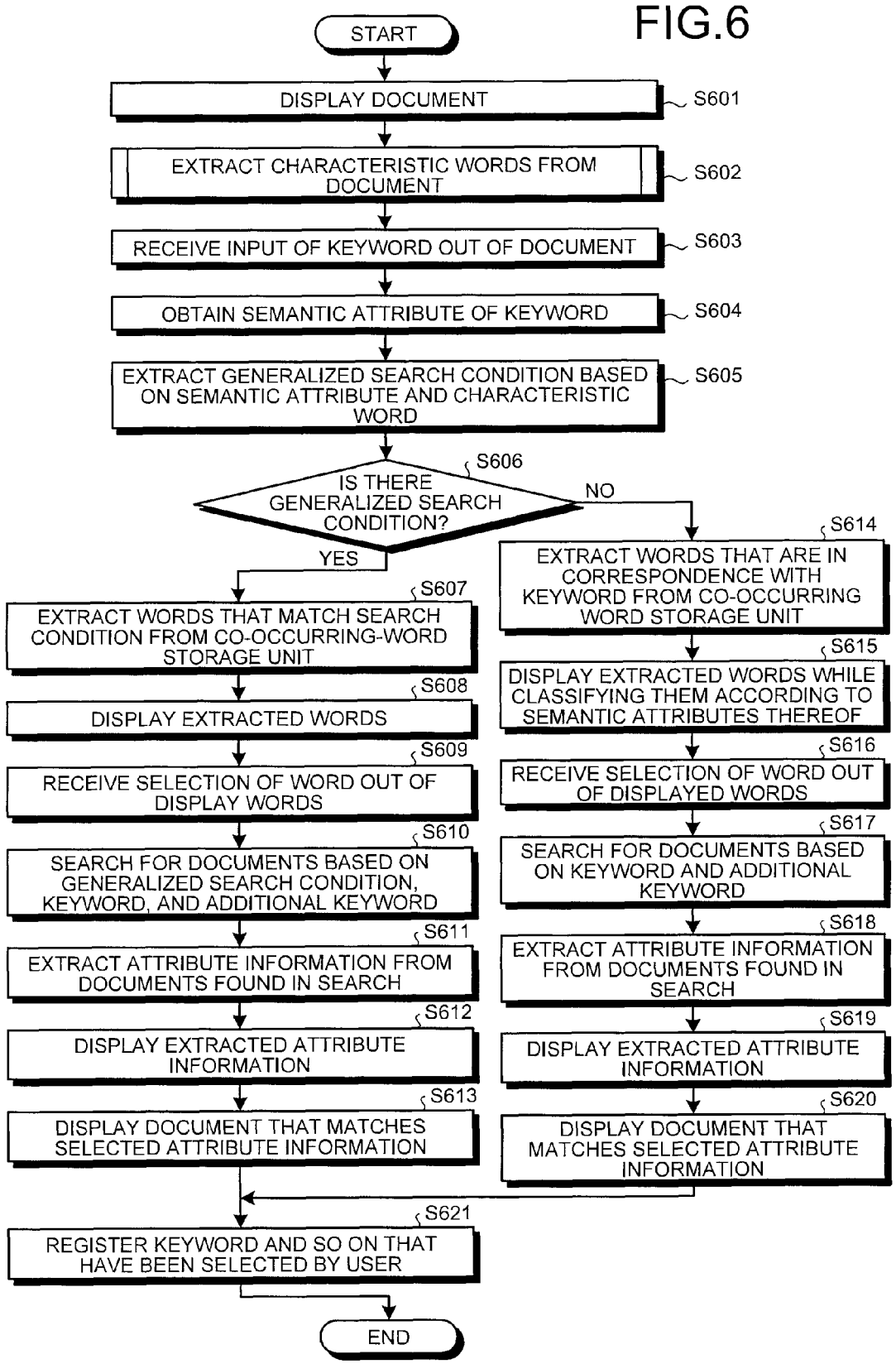
FIG. 6 is a flowchart of a procedure in a searching process performed by the desktop searching apparatus.

Exemplary embodiments of an information searching apparatus, an information searching method, and an information searching computer program product will be explained in detail, with reference to the accompanying drawings. In the exemplary embodiments explained below, the information searching apparatus is applied to a desktop searching apparatus. However, it is possible to apply the information searching apparatus to various other apparatuses besides the desktop searching apparatus.

As shown in FIG. 1, a desktop searching apparatus 100 according to a first embodiment of the present invention includes: a document accumulating unit 101; a co-occurring-word accumulating unit 102; a condition storage unit 103; a history storage unit 104; a semantic-attribute accumulating unit 105; a document displaying unit 106; an input receiving unit 107; a characteristic-word extracting unit 108; a semantic-attribute obtaining unit 109; a condition extracting unit 110; a word extracting unit 111; a word displaying unit 112; a word-selection receiving unit 113; a searching unit 114; a search-result displaying unit 115; an information generating unit 116; a document-input processing unit 117; a semantic-attribute analyzing unit 118; a co-occurring-word registering unit 119; a document registering unit 120; a document-attribute extracting unit 121; and a search-condition registering unit 122.

The desktop searching apparatus 100 is an apparatus that is operable to receive a keyword that has been selected by a user out of a document displayed by an application program such as a word processor or a web browser and to search in the document accumulating unit 101 for a document related to the received keyword.

The document accumulating unit 101 accumulates therein documents that are search targets in which a search is to be conducted, together with search index information. Examples of the search index information include: morphemes included in the accumulated documents, a format of each of the documents, the date on which each of the documents was created, and the creator of each of the documents. In a case where an e-mail message is accumulated in the document accumulating unit 101 as a document, it is acceptable to use the following information as the search index information: the date on which the e-mail message was sent/received, the sender/receiver of the e-mail message, and whether data was attached to the e-mail message.

It is possible to realize the document accumulating unit 101 by using a publicly-known desktop searching technique. Thus, further explanation thereof will be omitted.

The co-occurring-word accumulating unit 102 accumulates therein words each of which is in a co-occurrence relationship with any of the words contained in the documents accumulated in the document accumulating unit 101, while keeping the co-occurring words in correspondence with semantic attributes represented by the co-occurring words.

As shown in FIG. 2, a co-occurrence relationship storing table stores therein words in correspondence with their co-occurring words each of which is in a co-occurrence relationship with a corresponding one of the words, while classifying the co-occurring words according to the semantic attributes thereof. Any of the words and the co-occurring words that are stored in the co-occurrence relationship storing table can be used as a search key when a search is conducted for a document.

Also, each set that is stored in the co-occurrence relationship storing table and is made up of a word and another word being in a co-occurrence relationship with the word is contained in the same one of the documents stored in the document accumulating unit 101. However, the form of the co-occurrence relationship storing table is not limited to this example. The co-occurrence relationship storing table may have any other format as long as the co-occurrence relationship storing table stores therein a co-occurrence relationship between the words that appear in mutually the same one of the documents and makes it possible to conduct a search for the words that are in a co-occurrence relationship. Further, as a method for realizing the co-occurrence relationship storing stable, it is acceptable to use, for example, a relational database management system (RDBMS).

The condition storage unit 103 stores therein a generalized search condition storing table. The generalized search condition storing table stores therein specified information that is specified based on one of a keyword selected by the user and a document that contains the selected keyword, as well as a generalized search condition that corresponds to the specified information. The generalized search condition is a condition used for narrowing down the documents being the search targets and is obtained by generalizing search criteria used in searches that have previously been conducted by the user. By using such a generalized search condition to conduct a search, the user is able to conduct a desired search without having to specify a complicated search condition. The generalized search condition is generated from history information that is stored in the history storage unit 104, which is explained later. A method for generating the generalized search condition will be explained in detail later.

The generalized search condition includes a semantic attribute used for extracting a word that serves as an additional search keyword from the co-occurrence relationship storing table and a narrowing-down condition used for narrowing down the documents being the search targets. The semantic attribute denotes an attribute obtained by abstracting a word that serves a search keyword. For example, when the word that serves as the search keyword is "Ono" or "Nakamura", the semantic attribute is "name".

According to the first embodiment, as the narrowing-down condition used for narrowing down the documents, a "creator or sender/receiver" or a "date created or sent/received" is used. According to the first embodiment, the specified information is the "semantic attribute of keyword" or a "characteristic word" that has been extracted out of the document that contains the keyword. It is also acceptable to use information other than the semantic attribute of the keyword and the characteristic word as the specified information.

As shown in FIG. 3, the generalized search condition storing table stores therein "semantic attribute of keyword", "characteristic word", "semantic attribute of additional keyword", "attribute information used in narrowing-down process during search", "file format", "creator or sender/receiver", and "date created or sent/received", while keeping these pieces of information in correspondence with one another. Because the generalized search condition storing table has a table structure as described above, it is possible to identify the semantic attribute of an additional keyword and a narrowing-down condition used for narrowing down the documents during a search, based on the semantic attribute of a keyword and a characteristic word extracted from a document that contains the keyword. As the "attribute information used in narrowing-down process during search", one or more of the following are stored: "file format", "creator or sender/receiver", and "date created or sent/received". In other words, by referring to the "attribute information used in narrowing-down process during search", it is possible to identify one of the following as a field to be used as a narrowing-down condition: the "file format", the "creator or sender/receiver", and the "date created or sent/received".

The method used for storing the generalized search condition is not limited to the generalized search condition storing table shown in FIG. 3. For example, another arrangement is acceptable in which a keyword or a partial character string contained in the keyword is stored as a field that can be used in a search. When a different table structure like in this example is used, the method used by the condition extracting unit 110 (explained later) to extract the generalized search condition should also be changed according to the structure of the table, as necessary. For example, in a case where the generalized search condition storing table stores therein keywords or partial character strings each of which is contained in a corresponding one of the keywords, an arrangement is acceptable in which the condition extracting unit 110 extracts a generalized search condition by using also a keyword as a search key.

The semantic-attribute accumulating unit 105 stores therein a semantic attribute correspondence table used for identifying a semantic attribute from a word contained in a document. As shown in FIG. 4, the semantic attribute correspondence table stores therein a "pattern" for determining a character string and a "semantic attribute", while keeping them in correspondence with each other. For example, in a record 401 in the semantic attribute correspondence table shown in FIG. 4, a pattern "([^Hiragana A to N]+) Co., Ltd." (cf. A and N are the first and the last letters in the Japanese Hiragana and Katakana Alphabets) is kept in correspondence with a semantic attribute "name of company". By referring to the semantic attribute correspondence table, it is possible to obtain the semantic attribute that is in correspondence with a character string.

Also, in the example shown in FIG. 4, each of the patterns is written by using a regular expression like the ones used in the Practical Extraction and Report Language (Perl). It should be noted, however, that a pattern like "$name of company$" is evaluated as being replaced by an arbitrary pattern that is in correspondence with a semantic attribute (e.g., "name of company") that corresponds to a character string placed between the two "$" symbols. A process performed by using the semantic attribute correspondence table will be explained later. As explained here, types of semantic attributes that can be obtained by the semantic-attribute obtaining unit 109 (explained later) are specified, in advance, in the semantic attribute correspondence table. Examples of the semantic attributes include: "name of person", "name of company", "name of organization", "name of facility", and "date".

The history storage unit 104 stores therein a history storing table that shows, as a history, pieces of information that have been selected by the user as well as pieces of information that have been used in a process of narrowing down the detected documents, up to a time when a document is detected based on a keyword selected by the user.

As shown in FIG. 5, the history storing table stores therein, "keyword", "semantic attribute of keyword", "semantic attribute of additional keyword", "selected attribute information", "file format", "creator or sender/receiver", "date created or sent/received", and "characteristic words in original document", while keeping these pieces of information in correspondence with one another. Each of these fields will be explained later.

The document displaying unit 106 displays an arbitrary document for a user. A means used by the document displaying unit 106 for displaying a document may be a means that is exclusively used by the desktop searching apparatus 100. Alternatively, an application program such as a word processor or a web browser may be used.

The characteristic-word extracting unit 108 extracts a character string that forms a characteristic (hereinafter, a "characteristic word") from the document displayed by the document displaying unit 106. It is acceptable to use any method as a means for realizing the process performed by the characteristic-word extracting unit 108 to extract the characteristic word. For example, the characteristic-word extracting unit 108 can extract the characteristic word by using a publicly-known characteristic amount such as an Inverted Document Frequency (IDF).

The input receiving unit 107 receives, as a keyword, an input of a word that has been selected by the user out of the document displayed by the document displaying unit 106. An arrangement is acceptable in which the input receiving unit 107 receives, as a keyword, an arbitrary word that has been input by the user using a keyboard. Apart from the first embodiment, another arrangement is acceptable in which the input receiving unit 107 presents a dialog for receiving an input of a keyword so that the keyword input by the user through the dialog is received.

The semantic-attribute obtaining unit 109 obtains a semantic attribute of the keyword that has been received as the input by the input receiving unit 107, from the semantic-attribute accumulating unit 105.

In a case where the character string of the keyword that has been received as the input matches one of the criteria of the patterns stored in the semantic attribute correspondence table shown in FIG. 4, the semantic-attribute obtaining unit 109 obtains the semantic attribute that is in correspondence with the pattern, as the semantic attribute of the keyword. The method for obtaining the semantic attribute is not limited to the example described above; it is acceptable to use any other method.

The condition extracting unit 110 extracts a generalized search condition from the condition storage unit 103, by using one or both of the following as a search key: (a) the characteristic word extracted by the characteristic-word extracting unit 108 and (b) the semantic attribute of the keyword that has been obtained by the semantic-attribute obtaining unit 109. In other words, the condition extracting unit 110 extracts, as the generalized search condition, the semantic attribute of a word that serves as an additional keyword as well as a narrowing-down condition that is used during a document search.

The generalized search condition extracted by the condition extracting unit 110 will be used in one or both of the following situations: (a) when the word extracting unit 111 (explained later) searches for a word that co-occurs with the keyword and (b) when the searching unit 114 (explained later) narrows down the detected documents.

In a case where the condition extracting unit 110 has extracted a plurality of generalized search criteria, an arrangement is acceptable in which the plurality of generalized search criteria are presented to the user so that an optimal generalized search condition to be used is selected by the user.

Another arrangement is also acceptable in which the condition extracting unit 110 inquires of the user whether the extracted generalized search condition should be used in a document search or the like. In this situation, when the user agrees that the extracted generalized search condition should be used, the generalized search condition will be used in the document search or the like.

The word extracting unit 111 extracts a word that is in a co-occurrence relationship with the keyword from the co-occurring-word accumulating unit 102, based on the keyword and the generalized search condition extracted by the condition extracting unit 110. For example, in a case where the "semantic attribute of additional keyword" in the generalized search condition extracted by the condition extracting unit 110 is "name of facility", the word extracting unit 111 extracts, out of the words each of which is in a co-occurrence relationship with, and each of which is stored in correspondence with, the keyword within the co-occurring-word accumulating unit 102, the words that are stored in the field "name of facility", as the words to be used in the search.

The word displaying unit 112 displays the words extracted by the word extracting unit 111. The word-selection receiving unit 113 receives, from the user, a selection of a word to be used in the search that has been chosen out of the words displayed by the word displaying unit 112. Subsequently, the searching unit 114 (explained later) uses the word selected by the user, as an additional keyword, in the search. With this arrangement, in a case where a plurality of words have been extracted by the word extracting unit 111, it is possible to receive, from the user, the selection of the word to be used in the search that has been chosen out of the plurality of words.

The searching unit 114 searches in the document accumulating unit 101 for one or more documents each of which contains the keyword input to the input receiving unit 107 and the selected additional keyword that has been received by the word-selection receiving unit 113 and each of which satisfies the extracted generalized search condition. For example, in a case where the extracted generalized search condition is a generalized search condition within the generalized search condition storing table shown in FIG. 3 in which a parameter "file format" is specified in the field "selected attribute information", and a parameter "presentation" is specified in the field "file format", the searching unit 114 searches only for such documents of which the file format is a presentation.

In a case where no generalized search condition has been extracted, the searching unit 114 searches in the document accumulating unit 101 for one or more documents each of which contains both the keyword and the additional keyword.

For each of the documents in the group of documents that has been found in the search conducted by the searching unit 114, the document-attribute extracting unit 121 extracts attribute information of the document. According to the first embodiment, for each of the documents that have been extracted, the document-attribute extracting unit 121 extracts the attribute information of the document such as the format of the document, the date on which the document was created, the creator of the document, the date on which the document was sent/received in an e-mail message, the sender/receiver of the e-mail message, whether a document was attached to the e-mail message, based on the search index information stored in the document accumulating unit 101. The document-attribute extracting unit 121 extracts the attribute information of the documents only when the number of documents that have been detected by the searching unit 114 is larger than a predetermined number. The document-attribute extracting unit 121 does not perform the attribute extracting process when the number of detected documents is smaller than the predetermined number. The predetermined number may be arbitrarily chosen; however, it is "7" according to the first embodiment.

The search-result displaying unit 115 displays the documents that have been detected as a result of the search conducted by the searching unit 114. The search-result displaying unit 115 may display the detected documents themselves; alternatively, the search-result displaying unit 115 may display only the names of the detected documents. In the case where only the names of the detected documents are displayed, after a selection of a document name has been received from the user, the search-result displaying unit 115 displays the selected document.

The search-condition registering unit 122 registers, into the history storing table stored in the history storage unit 104, a record that shows the following elements while keeping them in correspondence with one another: the selection of the keyword that has been received from the user; the semantic attribute of the keyword; the semantic attribute of the additional keyword; the condition that is used for narrowing-down the search targets and has been selected by the user (e.g., the attribute information, the file format, the creator, the sender/receiver, the date created, and the date sent/received of the document); and the characteristic words that have been extracted from the document.

The information generating unit 116 includes a history judging unit 123 and performs a process for generating the generalized search condition, and registers the generalized search condition into the condition storage unit 103. Every time a new record is registered into the history storing table, the history judging unit 123 judges whether the history storing table includes a predetermined number or a larger number of records each of which contains an identical value with one in the new record within a predetermined field.

In a case where the history judging unit 123 has judged that there are as many records as, or more records than the predetermined number, the extraction-condition generating unit 116 generalizes the history information stored in these records and generates a generalized search condition. The extraction-condition generating unit 116 registers the generated generalized search condition into the condition storage unit 103. The procedure in this process will be explained in detail later.

The document-input processing unit 117 performs an input process on the documents to be stored in the document accumulating unit 101 included in the desktop searching apparatus 100. The documents on which the input process is performed by the document-input processing unit 117 may be in any format such as documents generated on a word processor, e-mail messages, presentation documents, spreadsheet documents, and Internet contents.

The semantic-attribute analyzing unit 118 analyzes the documents that have been input and extracts characteristic words that are contained in the input documents, so as to determine what the semantic attribute is. The method used for extracting the characteristic words and the method used for analyzing the semantic attributes are the same as the methods described above. Thus, the explanation thereof will be omitted. The types of the semantic attributes that are used in the determination process performed by the semantic-attribute analyzing unit 118 are predetermined. According to the first embodiment, the semantic-attribute analyzing unit 118 determines the semantic attribute by selecting one out of the following: "name of person", "name of company", "name of organization", "name of facility", and "date".

The co-occurring-word registering unit 119 analyzes co-occurring relationships, based on the characteristic words and the semantic attributes of the characteristic words that have been analyzed by the semantic-attribute analyzing unit 118. Subsequently, the co-occurring-word registering unit 119 registers the characteristic words that have been analyzed and are in a co-occurring relationship with each other, into the co-occurring-word accumulating unit 102, while keeping them in correspondence with each other. For analyzing the co-occurring relationships, it is acceptable to use any method, regardless of whether it is commonly known or not.

The document registering unit 120 registers the documents that have been input, into the document accumulating unit 101. When registering these documents, the document registering unit 120 extracts morphemes included in each of the input documents, the format of each of the input documents, the date on which each of the documents was created (the date sent/received, if the document is an e-mail message), the creator of each of the documents (the sender/receiver, if the document is an e-mail message), and whether a document was attached to the e-mail message. The document registering unit 120 then adds the extracted information to the search index and performs a process of updating the search index.

Next, a procedure in the searching process performed by the desktop searching apparatus 100 shown in FIG. 1 will be explained, with reference to FIG. 6.

First, the document displaying unit 106 displays an arbitrary document to the user (step S601). As shown in FIG. 7, in the following description of the process procedure, an example in which the displayed document is schedule information will be explained.

Returning to the description of FIG. 6, in the next step, the characteristic-word extracting unit 108 extracts characteristic words from the document displayed by the document displaying unit 106 (step S602). In the process procedure in the present example, it is assumed that the characteristic-word extracting unit 108 extracts "schedule", "visit", and "planning" from the document, as the characteristic words. The procedure in the process performed by the characteristic-word extracting unit 108 will be explained in detail later.

Next, the input receiving unit 107 receives a selection of a keyword that has been selected out of the document displayed by the document displaying unit 106 by the user using a pointing device or the like (step S603). As shown in FIG. 8, the input receiving unit 107 performs a process of inputting, as a keyword, a character string "Tozai Insurance Co., Ltd." that is included in an area selected by using the pointing device.

After that, from the semantic-attribute accumulating unit 105, the semantic-attribute obtaining unit 109 obtains a semantic attribute of the keyword that has been received, as the input, by the input receiving unit 107 (step S604). For example, in a case where the character string is "Tozai Insurance Co., Ltd.", the semantic-attribute obtaining unit 109 obtains "name of company" as the semantic attribute.

Subsequently, the condition extracting unit 110 extracts a generalized search condition from the condition storage unit 103, by using a characteristic word extracted by the characteristic-word extracting unit 108 and the semantic attribute of the keyword obtained by the semantic-attribute obtaining unit 109 as a search key (step S605). More specifically, the condition extracting unit 110 extracts the generalized search condition from the generalized search condition storing table in the condition storage unit 103, by using the semantic attribute "name of company" of the keyword as well as one of the three characteristic words, namely, "schedule", "visit", or "planning". In the process procedure in the present example, the condition extracting unit 110 extracts a record 301 from the generalized search condition storage table shown in FIG. 3, by using the semantic attribute "name of company" and the characteristic word "schedule", as the search key.

In other words, in the process procedure in the present example, the condition extracting unit 110 extracts the record 301 of generalized search condition because the semantic attribute "name of company" of the keyword that has been obtained by the semantic-attribute obtaining unit 109 matches the value in the field "semantic attribute of keyword" in the record 301, and also the one of the characteristic words extracted by the characteristic-word extracting unit 108, that is namely "schedule", matches the value in the field "characteristic word" in the record 301.

When the semantic attribute of the keyword and the characteristic word are compared with the values in the records by the condition extracting unit 110, the match may be either an exact match or a partial match. Apart from the first embodiment, another arrangement is acceptable in which the condition extracting unit 110 performs a process of ranking the extracted generalized search criteria in the order of the degree to which the semantic attribute of the keyword and the characteristic word match the values in the records.

After that, the condition extracting unit 110 judges whether any generalized search condition has been extracted (step S606).

In a case where the condition extracting unit 110 has extracted one or more generalized search criteria (step S606: Yes), the word extracting unit 111 extracts a word that has a semantic attribute indicated under "semantic attribute of additional keyword" within the extracted generalized search criteria and that is stored in correspondence with the keyword in the co-occurring-word accumulating unit 102 (step S607).

For example, in the co-occurring-word accumulating unit 102 as shown in FIG. 2, words that are stored in correspondence with the input keyword "Tozai Insurance Co., Ltd." are as follows: "Ono" and "Nakamura" for the semantic attribute "name of person"; "Chiyoda" and "Kawasaki" for the semantic attribute "name of place"; "Nanboku Electronics" for the semantic attribute "name of company"; "Research and Development Center" for the semantic attribute "name of organization"; "Tozai Insurance Kawasaki Branch" and "Tozai Headquarter Building" for the semantic attribute "name of facility"; and "Jul. 20, 2006" and "Aug. 22, 2006" for the semantic attribute "date". In the process procedure in the present example, an additional keyword to be used in the document search will be selected out of these words.

In the case where the record 301 shown in FIG. 3 is used as the generalized search condition, because the "semantic attribute of additional keyword" is "name of facility", the word extracting unit 111 obtains, out of the group of words listed above, "Tozai Insurance Kawasaki Branch" and "Tozai Headquarter Building", which are the words of which the semantic attribute is "name of facility".

After that, in a case where the word extracting unit 111 has extracted a plurality of words, the word displaying unit 112 displays the plurality of words (step S608). On the other hand, in a case where the word extracting unit 111 did not extract more than one word, an arrangement is acceptable in which the extracted word is just used as the additional keyword so that a process of displaying the word at step S608 and a process of receiving a selection of a word at step S609 are omitted.

As shown in FIG. 9, the word displaying unit 112 presents, in a window 901, the plurality of words that have been extracted by the word extracting unit 111. As mentioned here, an arrangement is acceptable in which the plurality of words are presented to the user by the word displaying unit 112 so that the user is prompted to select one of the words.

After that, the word-selection receiving unit 113 receives one of the words that has been selected by the user out of the plurality of words displayed by the word displaying unit 112 (step S609). In the process procedure in the present example, it is assumed that "Tozai Insurance Kawasaki Branch" has been selected by the user, as an additional keyword.

The searching unit 114 conducts a search in the document accumulating unit 101, based on the keyword, the additional keyword, and the generalized search condition (step S610). In the case where the record 301 shown in FIG. 3 is used as the generalized search condition, because the "attribute information used in narrowing-down process during search" is "file format", and also, the "file format" is "presentation", the searching unit 114 searches in the document accumulating unit 101 for such a document that contains the keyword "Tozai Insurance Co., Ltd." and the additional keyword "Tozai Insurance Kawasaki Branch" and of which the file format is "presentation". The method used for searching for the document is realized by using a commonly-known desktop searching technique or the like. Thus, the explanation thereof will be omitted.

Subsequently, in a case where the searching unit 114 has detected "7" or more documents, "7" being the predetermined number, the document-attribute extracting unit 121 extracts, from each of the detected documents, attribute information representing the document (step S611). In the process procedure in the present example, the document-attribute extracting unit 121 extracts, as the attribute information, the file format, the date on which the file was created, the creator of the file, the date on which the file was sent/received as an e-mail message, and the sender/receiver of the e-mail message. In a case where the number of detected documents is smaller than 7, the document-attribute extracting unit 121 does not perform this extracting process, but the search-result displaying unit 115 displays only the names of the detected files.

After that, the search-result displaying unit 115 classifies the attribute information that has been extracted by the document-attribute extracting unit 121 according to the types of attributes and displays these types of attributes (step S612).

As shown in FIG. 10, the search-result displaying unit 115 displays a plurality of values for each type of attribute. (For example, in a case where the type of attribute is "date created or sent", the search-result displaying unit 115 displays values such as "less than a week ago", "less than a month ago", and "one month ago or before".) In the example shown in FIG. 10, because the file format is narrowed down to presentations by the generalized search condition, attribute information other than the file format is presented.

Incidentally, in a case where, of the attribute information that has been extracted by the document-attribute extracting unit 121, if a matching ratio of the attribute information that is in common among the documents is lower than a predetermined level, the search-result displaying unit 115 does not have to display the attribute information.

Also, as shown in FIG. 10, the search-result displaying unit 115 displays the date on which the file was created, together with the date on which e-mail message was sent/received, and also displays the creator of the file, together with the sender/receiver of the e-mail message. Also, in FIG. 10, the "date created or sent/received" is presented for the periods such as "less than a week ago" "less than a month ago", and "one month ago or before"; however, it is acceptable to present the dates by adding more periods such as "less than three months ago", and "less than six months ago". Further alternatively, it is acceptable to present the dates by using a specific day and time, e.g., "3:32 p.m. on Jul. 20, 2006".

In FIG. 10, it is assumed that the user has selected the attribute information of which the "date created or sent/received" is "less than a month ago", out of the attribute information displayed by the search-result displaying unit 115. In this situation, the search-result displaying unit 115 further displays "EMS system proposal. ppt" and "Workflow system proposal. ppt", which are the documents that match the attribute information that has been selected by the user (i.e., the date created or sent/received is less than a month ago). Accordingly, the user is able to further select one of the documents, for example, "EMS system proposal. ppt", as his/her desired file.

In a case where the searching unit 114 has detected only two documents, there is no need to classify the documents according to the attribute information thereof. Thus, as shown in FIG. 11, the search-result displaying unit 115 displays only the names of the documents, without displaying the types of the attribute information. Accordingly, it is possible to receive, from the user, a selection of one of the documents to be displayed.

Figure 12:
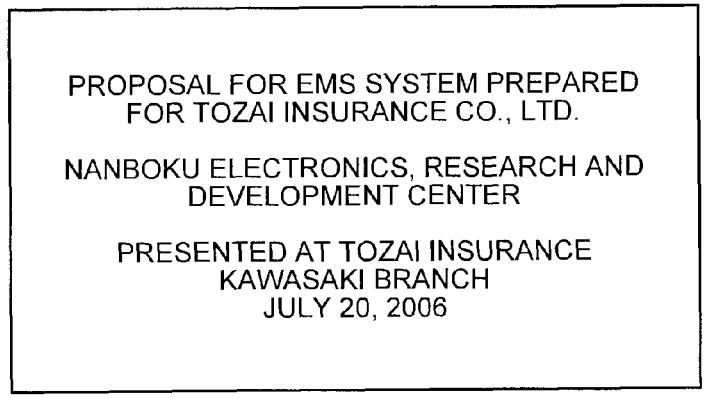
FIG. 12 is a diagram for illustrating an example of a document displayed by the search-result displaying unit in a case where a selection of a document has been received from a user.

Subsequently, the search-result displaying unit 115 displays the document that has been selected by the user and received as the selection (step S613). As shown in FIG. 12, it can be observed that the document that is displayed by the search-result displaying unit 115 as a search result contains both the keyword "Tozai Insurance Co., Ltd." and the additional keyword "Tozai Insurance Kawasaki Branch".

On the other hand, in a case where the condition extracting unit 110 has extracted no generalized search condition (step S606: No), the word extracting unit 111 extracts all the words that are stored in correspondence with the keyword within the co-occurring-word accumulating unit 102 (step S614). As additional information, the processes at step S614 and thereafter will be performed, not only in the case where no generalized search condition has been extracted, but also in a case where the user has decided that he/she will not use the extracted generalized search condition.

Figure 13:
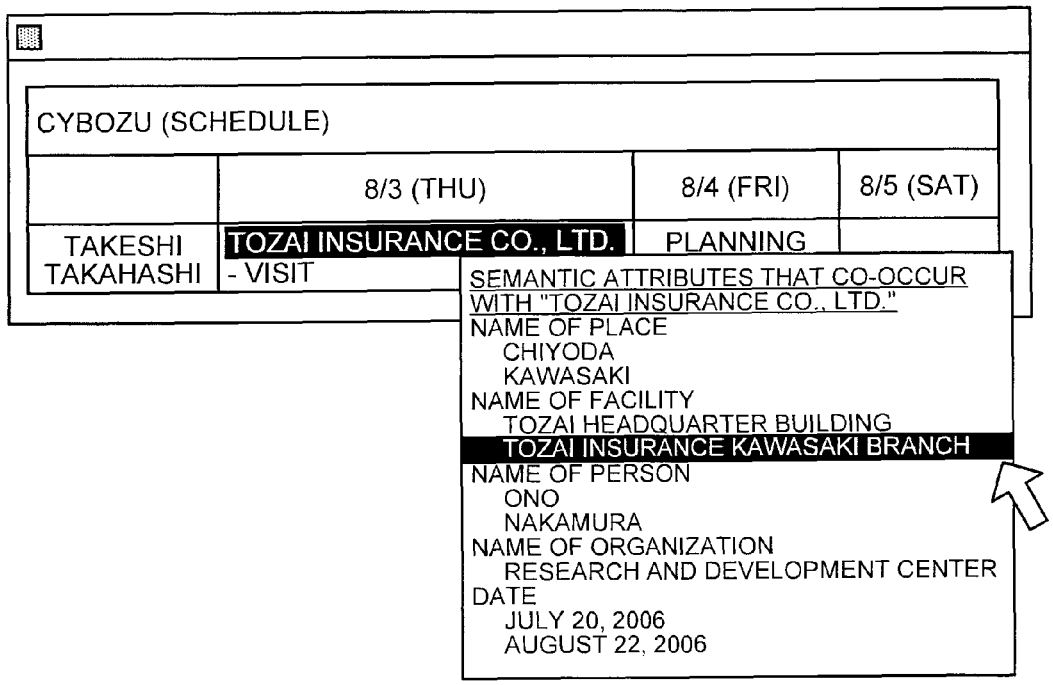
FIG. 13 is a diagram for illustrating an example in which words that have been extracted by the word displaying unit are displayed while being classified according to semantic attributes thereof.

After that, the word displaying unit 112 displays the words that have been extracted by the word extracting unit 111, while classifying the extracted words according to the semantic attributes thereof (step S615). As shown in FIG. 13, the word displaying unit 112 displays the words that are in correspondence with the keyword "Tozai Insurance Co., Ltd.", while classifying the words according to the semantic attributes thereof such as "name of place", "name of facility", "name of person", "name of organization", and "date".

Subsequently, the word-selection receiving unit 113 receives a semantic attribute and a word that have been selected by the user out of the plurality of words displayed by the word displaying unit 112 (step S616). The reason why the process described above is performed is because, in a case where no generalized search condition has been detected, it is not possible to narrow down the documents by using an additional keyword or a generalized search condition. By performing the process described above where the selection of a word is received from the user after all the words that co-occur with the keyword are displayed, it is possible to search for a document by using the received selected word as an additional keyword. Consequently, it is possible to easily detect a document desired by the user.

In the example shown in FIG. 13, it is assumed that the word-selection receiving unit 113 has received an input indicating that "name of facility", which is one of the semantic attributes, and "Tozai Insurance Kawasaki Branch", which is listed as one of names of facilities, have been selected. The semantic attribute that has been received as the selection will be stored in the "selected attribute information" field within the history storing table.

The searching unit 114 searches in the document accumulating unit 101 based on the keyword and the additional keyword (step S617). In the process procedure in the present example, the keyword is "Tozai Insurance Co., Ltd.", while the additional keyword is "Tozai Insurance Kawasaki Branch". After that, the document-attribute extracting unit 121 extracts attribute information out of the documents that have been detected by the searching unit 114 (step S618).

Subsequently, the search-result displaying unit 115 classifies the attribute information extracted by the document-attribute extracting unit 121 according to the types of attributes thereof, and displays these types of attributes as well as values for each of the attributes (step S619). As shown in FIG. 14, the search-result displaying unit 115 displays a plurality of values for each type of attribute by using a tree structure. In the example shown in FIG. 14, it is assumed that the user has selected "file format" as an attribute and also selected "presentation" as a value for the attribute, out of the attributes and the values for each of the attributes that have been displayed by the search-result displaying unit 115.

When the user has selected one of the attributes, the search-result displaying unit 115 displays one or more names of documents each of which has the selected attribute (step S620). As shown in FIG. 15, the documents have been narrowed down to those of which the file format is a presentation, based on the selection by the user. Thus, the search-result displaying unit 115 displays "EMS system proposal. ppt" and "Workflow system proposal. ppt" as the names of the documents. After that, when one of the names of the documents has been selected, the search-result displaying unit 115 displays the document, as shown in FIG. 12.

Subsequently, the search-condition registering unit 122 stores the keyword and the additional keyword that have been selected by the user, as well as the semantic attribute of the additional keyword and the attribute that has been selected for selecting the document, into the history storage unit 104, while keeping them in correspondence with one another (step S621). Because these pieces of information are registered in the history storage unit 104, it is possible to generate the generalized search criteria.

The search-condition registering unit 122 registers the information described above into the history storage unit 104 as the history information. The registered history information will be explained with reference to FIG. 5. In the history storing table shown in FIG. 5, the keyword that has been input to the input receiving unit 107 is stored into the field "keyword". The value of the semantic attribute that has been obtained by the semantic-attribute obtaining unit 109 with regard to the keyword that has been input to the input receiving unit 107 is stored into the field "semantic attribute of keyword". The semantic attribute that has been selected by the user and received at step S616 or the like in FIG. 6 is stored into the field "selected attribute information". The attribute information of the desired file of the user that has been selected by the user at step S616 in FIG. 6 is stored into the fields "file format", "creator or sender/receiver", and "date created or sent/received". The characteristic words that have been extracted by the characteristic-word extracting unit 108 from the document displayed by the document displaying unit 106 are stored into the field "characteristic words in original document". Because these pieces of information are stored in the corresponding fields, it is possible to generate the generalized search criteria.

When the process described above has been performed, the document that is desired by the user is presented. Thus, the process is ended. In a case where it is possible to use a generalized search condition in the process procedure described above, the number of semantic attributes and the number of pieces of attribute information that are presented to the user by the desktop searching apparatus 100 is reduced. Thus, it is possible to reduce the burden of the user having to specify the search condition.

In addition, in the process procedure described above, in a case where it is not possible to use a generalized search condition, the user needs to specify a larger number of search criteria than in the case where it is possible to use a generalized search condition. However, the user is able to specify the search criteria while browsing the search criteria presented by the desktop searching apparatus 100.

Figure 16:
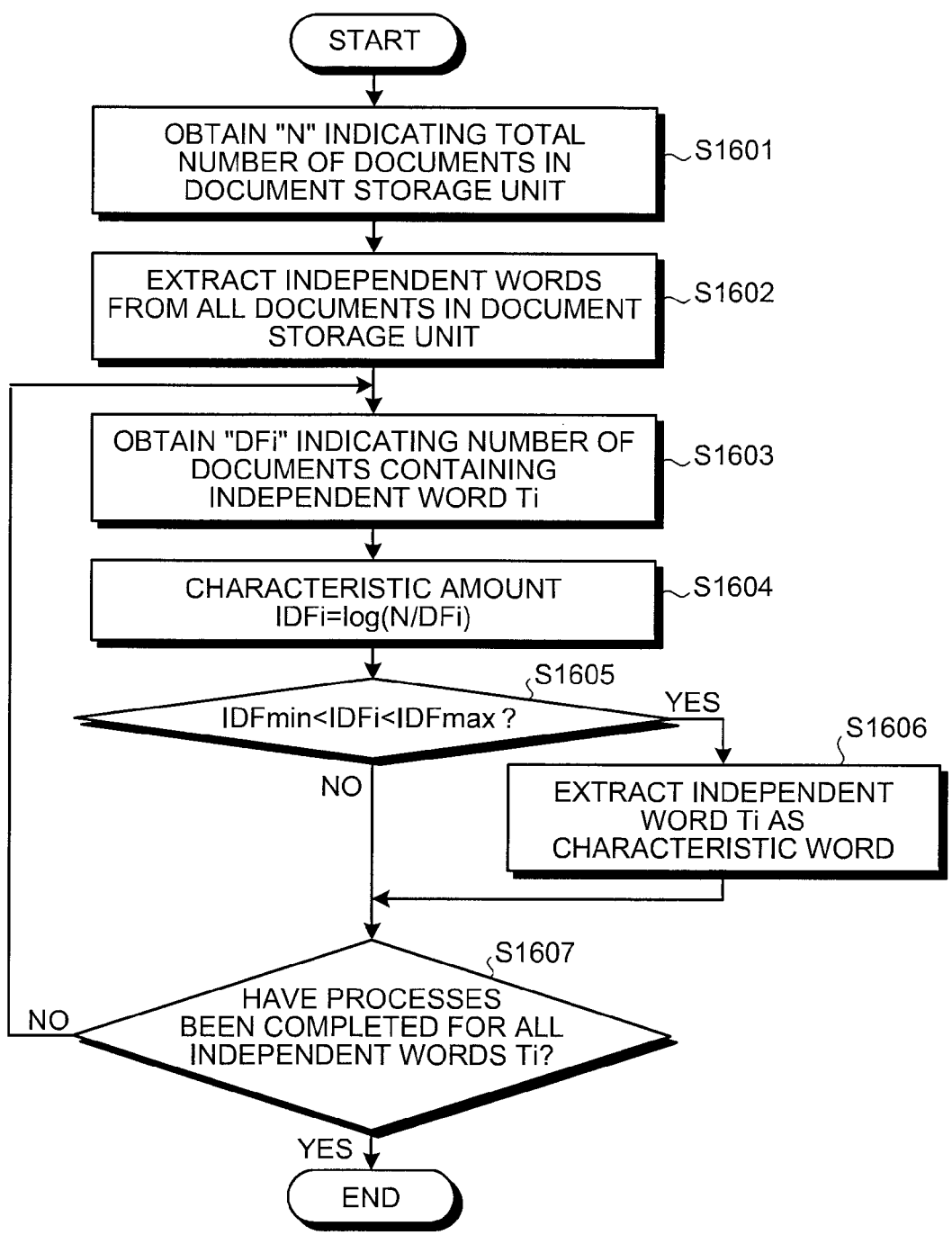
FIG. 16 is a flowchart of a procedure in a process performed by a characteristic-word extracting unit to extract a characteristic word from a document.

Next, the procedure in the process at step S602 shown in FIG. 6 that is performed by the characteristic extracting unit 108 to extract the characteristic words from the documents will be explained, with reference to FIG. 16.

First, the characteristic-word extracting unit 108 obtains a number N indicating the total number of documents registered in the document accumulating unit 101 (step S1601).

Next, the characteristic-word extracting unit 108 performs a morphological analysis on the document displayed by the document displaying unit 106 and extracts independent words (step S1602).

After that, the characteristic-word extracting unit 108 obtains a number DFi indicating the number of documents stored in the document accumulating unit 101 that each contains an independent word Ti, which is an i'th independent word (step S1603). In this situation, "i" is a variable that expresses a number that is equal to or larger than "0" and is smaller than the number of independent words that have been extracted.

Subsequently, with respect to the i'th independent word Ti, the characteristic-word extracting unit 108 calculates a characteristic amount, IDFi=log(N/DFi) (step S1604).

After that, the characteristic-word extracting unit 108 judges whether the calculated value IDFi satisfies the following inequality where IDFmin denotes a predetermined lower limit value and IDFmax denotes a predetermined upper limit value (step S1605):

$$IDFmin < IDFi < IDFmax$$

In a case where the characteristic-word extracting unit 108 has judged that the requisite above is satisfied (step S1605: Yes), the independent word Ti is extracted as a characteristic word (step S1606). On the contrary, in a case where the characteristic-word extracting unit 108 has judged that the requisite above is not satisfied (step S1605: No), no particular process is performed on the independent word Ti.

After that, the characteristic-word extracting unit 108 judges whether the process has been finished on each of all the independent words Ti's (step S1607). In a case where the characteristic-word extracting unit 108 has judged that the process has not been finished on all the independent words Ti's (step S1607: No), the characteristic-word extracting unit 108 increments the variable i by 1 so that the process at steps S1603 through S1606 can be performed again.

On the other hand, in a case where the characteristic-word extracting unit 108 has judged that the process has been finished on each of all the independent words Ti's (step S1607: Yes), all the processes have been completed.

Next, the process performed by the characteristic-word extracting unit 108 will be explained, with reference to a specific example. It is assumed that 200,000 documents are registered in the document accumulating unit 101. First, the characteristic-word extracting unit 108 obtains the number N=200,000 at step S1601.

Next, at step S1602, the characteristic-word extracting unit 108 performs, for example, a morphological analysis on the document shown in FIG. 7 and obtains the following words as independent words: "weekly", "schedule", "8", "3", "Thu", "4", "Fri", "5", "Sat", "Takahashi", "Takeshi", "Tozai Insurance", "visit", "planning", and "meeting".

After that, at step S1603, the characteristic-word extracting unit 108 obtains a number of documents DFi=600 because, for example, the independent word "weekly" is contained in 600 documents out of all the documents registered in the document accumulating unit 101. At step S1604, the characteristic-word extracting unit 108 obtains a characteristic amount value IDFi for the independent word "weekly" by calculating log(200000/600)≅5.81.

At step S1605, for example, in a case where the values are set so as to satisfy IDFmin=4.0 and IDFmax=5.0, because the IDFi value for the independent word "weekly" is 5.81, an inequality IDFi>IDFmax is obtained. Thus, the characteristic-word extracting unit 108 does not extract "weekly" as a characteristic word.

Similarly, because the independent word "schedule" is contained in 1500 documents, at step S1603, the characteristic-word extracting unit 108 obtains a number of documents DFi=1500. Subsequently, at step S1604, the characteristic-word extracting unit 108 obtains a characteristic amount value IDFi for the independent word "schedule" by calculating log(200000/1500)=4.89.

At step S1605, because the IDFi value for the independent word "schedule" is 4.89, an inequality IDFmin<IDFi<IDFmax is obtained. Thus, at step S1606, the characteristic-word extracting unit 108 extracts "schedule" as a characteristic word.

In the process procedure in the present example, each of the values of IDFmin and IDFmax is arranged to be a constant. However, the process procedure is not limited to this example where each of these values is a constant. For example, another arrangement is acceptable in which the values of IDFmin and IDFmax are determined relative to, or updated based on, the IDF values of the words contained in the group of documents registered in the document accumulating unit 101.

By performing the process procedure described above on each of the independent words, the characteristic-word extracting unit 108 extracts "schedule", "visit", and "planning" as the characteristic words, from the document shown in FIG. 7.

Next, the procedure in the process performed by the desktop searching apparatus 100 to generate generalized search criteria will be explained, with reference to FIG. 17. According to the first embodiment, every time the search-condition registering unit 122 stores information into the history storage unit 104, a generalized search condition is generated. However, the first embodiment is not limited to this example where generalized search criteria are generated at such a time. It is acceptable to generate generalized search criteria at any other time.

First, the extraction-condition generating unit 116 performs a process of reading a record of history information that has newly been added to the history storage unit 104, from the history storage unit 104 (step S1701).

Next, the extraction-condition generating unit 116 performs a process of reading another record of history information that has already been registered in the history storage unit 104, from the history storage unit 104 (step S1702).

After that, the history judging unit 123 judges whether the "semantic attribute of keyword" values in the records that have been read match each other. The history judging unit 123 also judges whether there are one or more words in common in the "characteristic words in original document" fields between the records that have been read (step S1703).

In a case where the history judging unit 123 has judged that the "semantic attribute of keyword" values in the two records do not match each other, and also that there are no words in common in the "characteristic words in original document" fields between the two records (step S1703: No), no particular process will be performed.

On the other hand, in a case where the history judging unit 123 has judged that the "semantic attribute of keyword" values in the two records match each other, and/or that there are one or more words in common in the "characteristic words in original document" fields between the two records (step S1703: Yes), the extraction condition generated unit 116 performs a process of generating a new generalized search condition (step S1704). At the time when the generalized search condition is generated, no specific condition is set in the generalized search condition. After the process described below is performed, criteria are set in the generalized search condition.

The extraction-condition generating unit 116 judges whether the "semantic attribute of keyword" values in the two records of history information match each other (step S1705). In a case where the extraction-condition generating unit 116 has judged that the values match each other (step S1705: Yes), the extraction-condition generating unit 116 assigns the matching semantic attribute to the "semantic attribute of keyword" in the generalized search condition (step S1706).

Next, in a case where the extraction-condition generating unit 116 has judged that the "semantic attribute of keyword" values in the two records of history information do not match each other (step S1705: No) or after the matching semantic attribute has been assigned (step S1706), the extraction-condition generating unit 116 judges whether there are one or more words in common in the "characteristic words in original document" fields (step S1707). In a case where the extraction-condition generating unit 116 has judged that there are one or more words in common in the "characteristic words in original document" fields (step S1707: Yes), the extraction-condition generating unit 116 assigns the one or more words in common to the "characteristic words in original document" in the generalized search condition (step S1708).

In a case where the extraction-condition generating unit 116 has judged that there are no words in common in the "characteristic words in original document" fields (step S1707: No) or after the one or more characteristic words in common have been assigned (step S1708), the extraction-condition generating unit 116 judges whether the "semantic attribute of additional keyword" values match each other in the two records of history information that have been read (step S1709). In a case where the extraction-condition generating unit 116 has judged that the "semantic attribute of additional keyword" values match each other (step S1709: Yes), the extraction-condition generating unit 116 assigns the matching semantic attribute to the "semantic attribute of additional keyword" in the generalized search condition (step S1710).

In a case where the extraction-condition generating unit 116 has judged that the "semantic attribute of additional keyword" values do not match each other (step S1709: No), or after the matching semantic attribute has been assigned (step S1710), the extraction-condition generating unit 116 judges whether the "attribute information used in narrowing-down process during search" values match each other in the two records of history information that have been read (step S1711). In a case where the extraction-condition generating unit 116 has judged that the "attribute information used in narrowing-down process during search" values match each other (step S1711: Yes), the extraction-condition generating unit 116 assigns the matching "attribute information used in narrowing-down process during search" to the "attribute information used in narrowing-down process during search" in the generalized search condition (step S1712).

On the other hand, in a case where the extraction-condition generating unit 116 has judged that the "attribute information used in narrowing-down process during search" values do not match each other (step S1711: No), or after the matching "attribute information used in narrowing-down process during search" has been assigned (step S1712), the extraction-condition generating unit 116 judges whether attribute information values match each other in the two records of history information that have been read in one or more of the following fields: "file format", "creator or sender/receiver", and "date created or sent/received" (step S1713). In a case where the extraction-condition generating unit 116 has judged that the attribute information values match each other in one or more of the fields, namely "file format", "creator or sender/receiver", and "date created or sent/received" (step S1713: Yes), the extraction-condition generating unit 116 assigns the matching attribute information to the corresponding attribute information in the generalized search condition (step S1714).

Subsequently, the extraction-condition generating unit 116 judges whether all the records of history information have been read from the history storage unit 104 (step S1715). In a case where the extraction-condition generating unit 116 has judged that not all the records of history information have been read yet (step S1715: No), the extraction-condition generating unit 116 starts the process of reading the record at step S1702 again. With this arrangement, the process described above will be performed on each of all the records of history information.

When the extraction-condition generating unit 116 has judged that all the records of history information have been read (step S1715: Yes), all the processes have been completed.

For example, in a case where the extraction-condition generating unit 116 judges whether it is possible to generate a generalized search condition, between a record of history information (i.e., a record 501) that has newly been added to the history storing table shown in FIG. 5, and another record of history information (i.e., a record 502) that has been stored in the history storing table in advance, the "semantic attribute of keyword" values match each other, and also there is one word in common in the "characteristic words in original document" fields, it is possible to generate a new generalized search condition.

Figure 17:
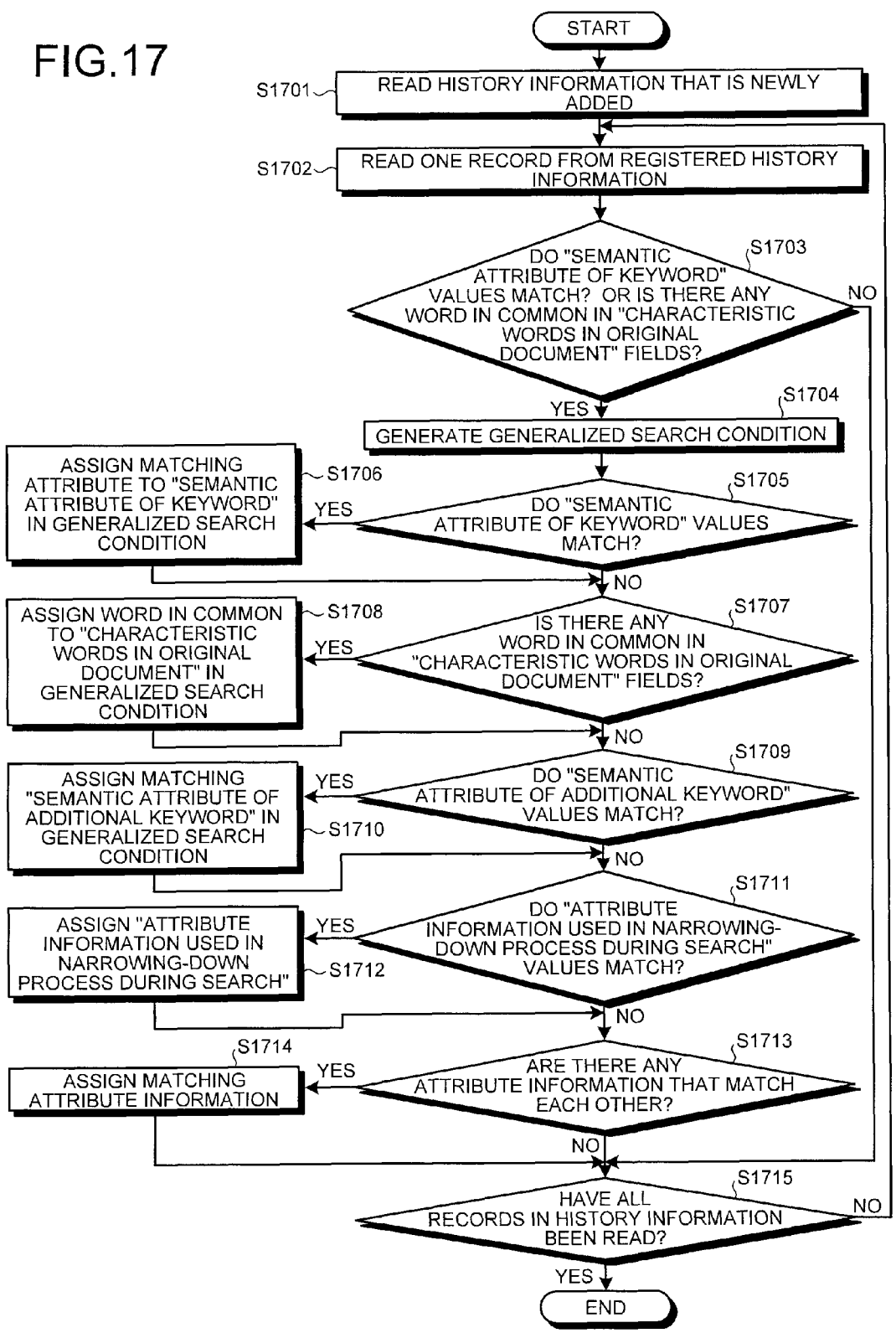
FIG. 17 is a flowchart of a procedure in a process performed by the desktop searching apparatus to generate a generalized search condition.

As shown in FIG. 18, by performing the process procedure shown in FIG. 17, the extraction-condition generating unit 116 is able to generate the generalized search condition that stores therein the matching field information between the record 501 and the record 502 shown in FIG. 5.

In the process procedure shown in FIG. 17, in a case where there is more than one record of history information to which a newly-registered record of search history is similar, the extraction-condition generating unit 116 generates a plurality of generalized search criteria. However, the first embodiment is not limited to this example where the extraction-condition generating unit 116 generates the plurality of generalized search criteria. For example, another arrangement is acceptable in which, when having judged that the plurality of generalized search criteria that have been generated are similar to one another, the extraction-condition generating unit 116 combines these generalized search criteria together. Yet another arrangement is also acceptable in which, in a case where a generalized search condition that has just been generated is similar to another generalized search condition that has already been stored in the condition storage unit 103, the extraction-condition generating unit 116 combines these generalized search criteria together.

One example of a method for combining generalized search criteria is that, only when pieces of attribute information match one another among all three or more records of search history or among all three or more generalized search criteria, the attribute information is assigned to attribute information of a newly-generated generalized search condition. Another example is that, when pieces of attribute information match one another among only some of the records of search history or among some of the generalized search criteria, a plurality of mutually-different values are assigned to attribute information of a generalized search condition. In this situation where the plurality of mutually-different values are assigned, an arrangement is acceptable in which, when the generalized search condition is used again, the word-selection receiving unit 113 or the like included in the desktop searching apparatus 100 inquires of the user which one of the values should be used.

After that, the extraction-condition generating unit 116 registers, into the condition storage unit 103, the generalized search condition that has been generated in the manner described above. The generalized search criteria that are stored in the condition storage unit 103 will be extracted by the condition extracting unit 110 and will be used when a document search is conducted by the user.

In addition, another arrangement is acceptable in which the extraction-condition generating unit 116 allows the user to correct the generated generalized search condition. As shown in FIG. 19, the user is able to put a name of the search condition into a "name of searching method" box 1901. The user has further performed an operation of deleting "one month ago" stored in a "date created or sent/received" box 1902 shown in FIG. 19.

Figure 20:
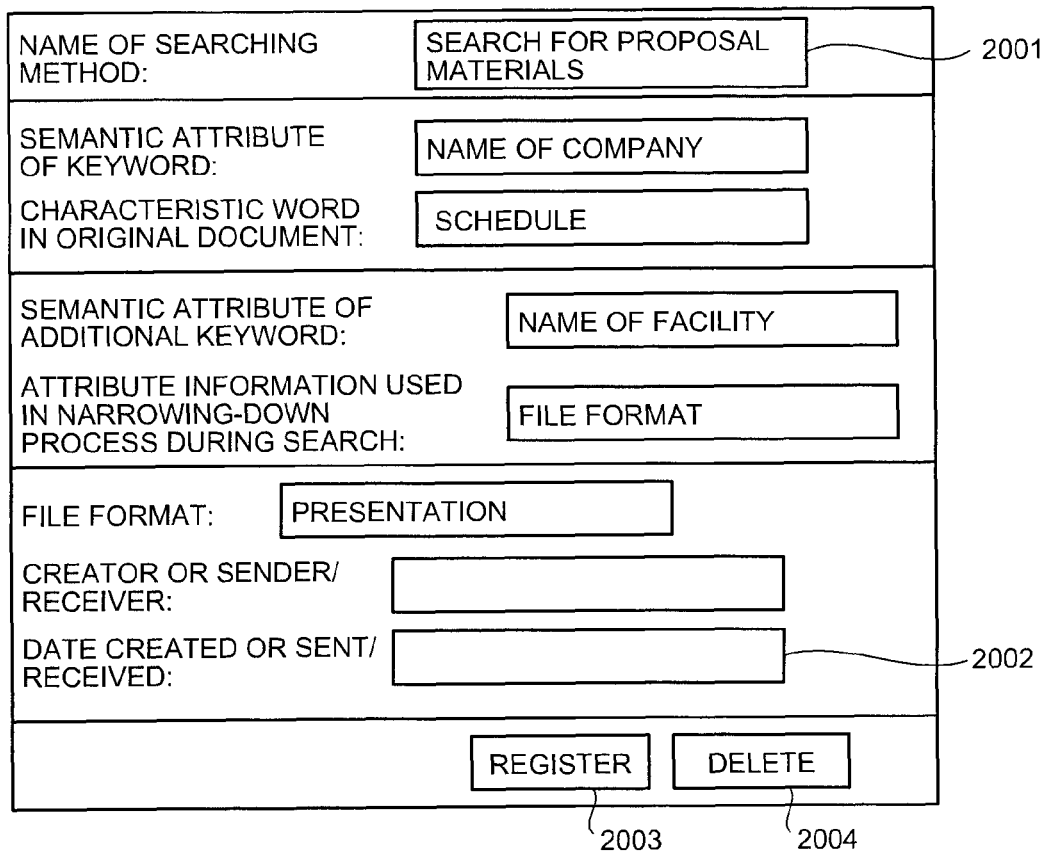
FIG. 20 is a diagram for illustrating an example in which the user interface is shown in a state after the user has performed the correcting operation.

As shown in FIG. 20, after the correction made by the user has been received, it can be observed that the "name of searching method" box 2001 is changed so as to read "search for proposal materials", and also the condition that used to be shown in the "date created or sent/received" box 2002 has been deleted. After having completed the correction, the user informs the desktop searching apparatus 100 that the correction has been completed, by pushing a register button 2003. Thus, the extraction-condition generating unit 116 stores the corrected generalized search condition into the condition storage unit 103. Also, if the user has pushed a deletion button 2004, the extraction-condition generating unit 116 discards the corrected generalized search condition without registering it.

Figure 21:
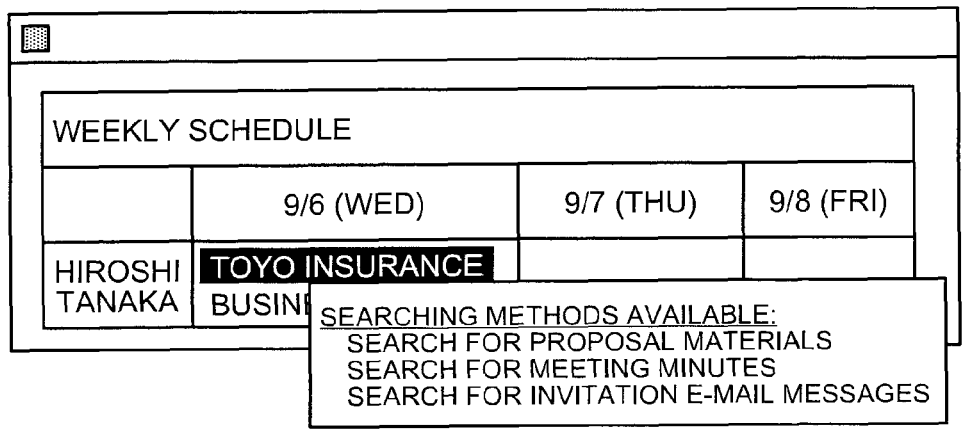
FIG. 21 is a diagram for illustrating an example in which, in a case where a keyword has been selected by the user, names of generalized search criteria that have been extracted based on the keyword are presented.

Next, the process that is performed after a "name of searching method" is given to each of generalized searching criteria will be explained. As shown in FIG. 21, when the user has selected a keyword, it is possible to allow the user to recognize the contents of the generalized search criteria because the names of the generalized search criteria are presented. After that, it is assumed that the user has selected the searching method "search for proposal materials" in the example shown in FIG. 21.

Figure 22:
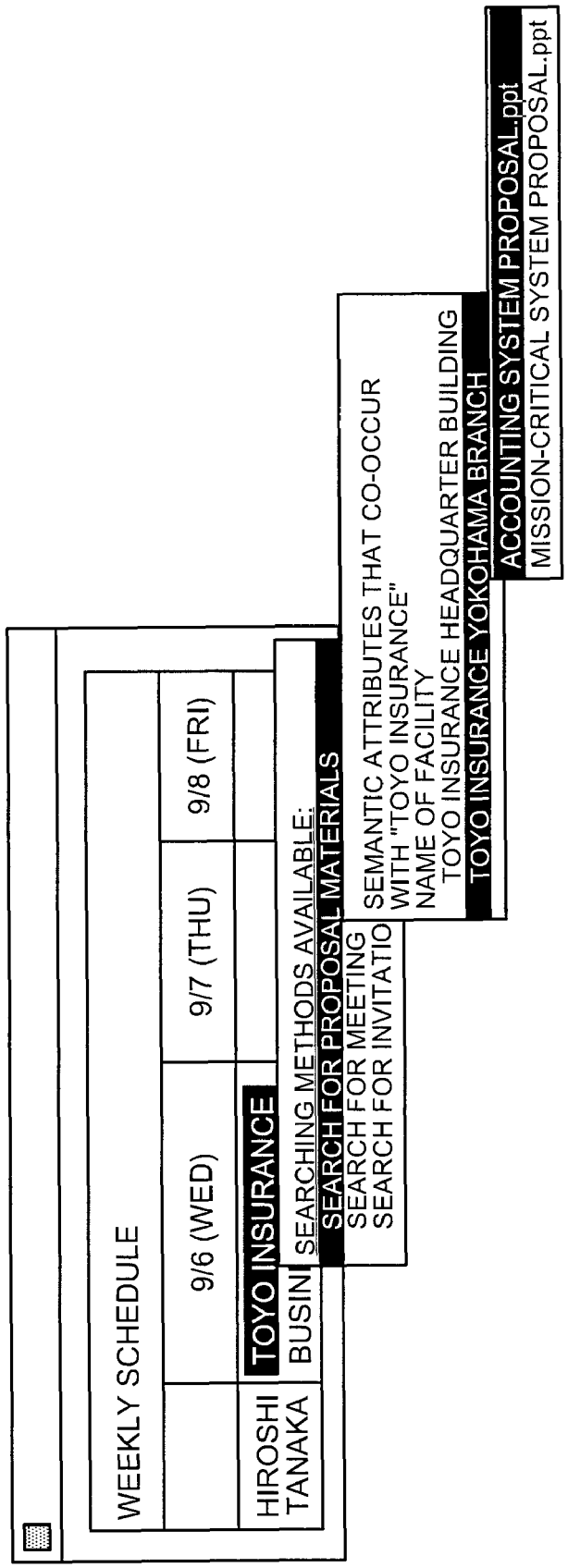
FIG. 22 is a diagram for illustrating an example of windows that are displayed in a case where a selection of a method to "search for proposal materials" has been received from the user.

As shown in FIG. 22, the desktop searching apparatus 100 presents co-occurring semantic attributes and narrows down documents during a search, according to the criteria that are specified in the generalized search condition that corresponds to the searching method "search for proposal materials".

When the desktop searching apparatus 100 according to the first embodiment is used, because the additional keywords are automatically narrowed down based on the semantic attributes, by using the generalized search condition, the search condition used in the document search is specified without the user's having to specify the search condition in detail. Thus, it is possible to improve the usability.

The present invention is not limited to the exemplary embodiments described above. It is possible to apply various modifications to the present invention as explained below.

In the description of the first embodiment above, the example in which the keyword is selected out of the document is explained. However, the input receiving unit 107 does not have to receive an input of a keyword in the manner according to the first embodiment shown in FIG. 8. A modification example in which an input of a keyword is received in a different window will be explained below.

Figure 23:
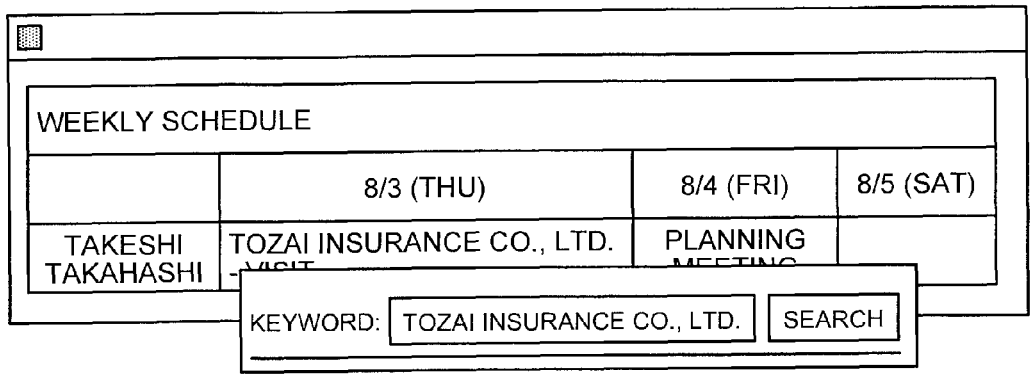
FIG. 23 is a diagram for illustrating an example of a window that is displayed for the purpose of receiving an input of a keyword.

As shown in FIG. 23, an arrangement is acceptable in which an input of a keyword is received in a window that is different from a window in which a document is displayed.

In this modification example, the user needs to perform an operation to call up the window shown in FIG. 23 onto the screen. This call-up operation can be performed by using any method. For example, the user may push a specific button that is prepared in advance on the screen or may push a specific button that is provided in an input device such as a mouse.

Figure 24:
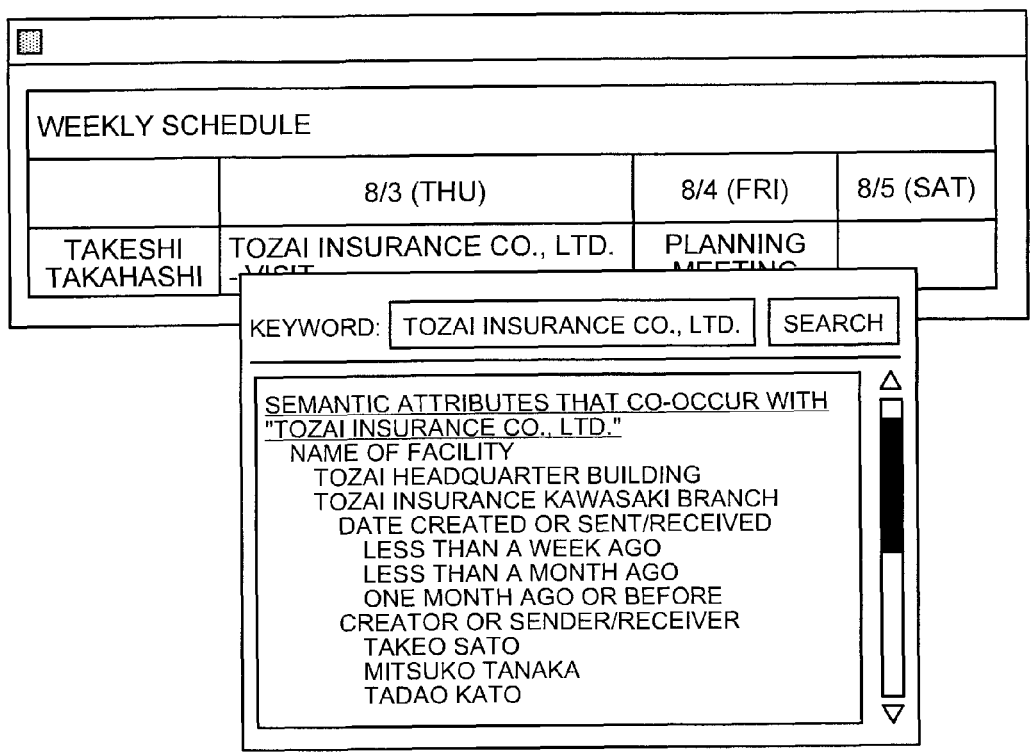
FIG. 24 is a diagram for illustrating an example in which, in a case where a search is conducted after a keyword has been input, words that co-occur with the input keyword are displayed by the search-result displaying unit while being classified according to the types of attributes thereof.

As shown in FIG. 24, after displaying the words that match a generalized search condition, the search-result displaying unit 115 displays the attribute information under the words while classifying the attribute information according to the types thereof. As shown in FIG. 24, an arrangement is acceptable in which the attribute information is displayed in one window in such a manner that the user is able to trace the tree structure.

Figure 25:
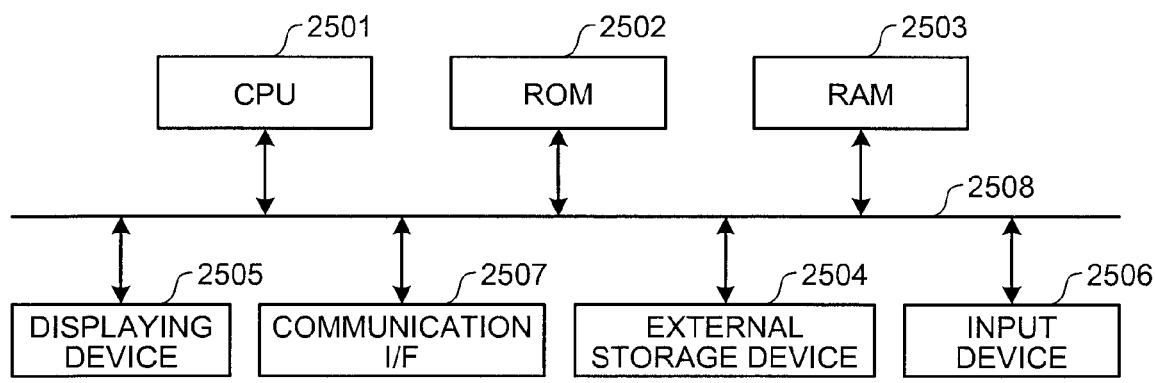
FIG. 25 is a diagram for illustrating a hardware configuration of the desktop searching apparatus.

As shown in FIG. 25, the desktop searching apparatus 100 according to each of the exemplary embodiments and the modification examples includes, as its hardware configuration, the following elements: a Read-Only Memory (ROM) 2502 that stores therein a desktop search processing program and the like; a Central Processing Unit (CPU) 2501 that controls the constituent elements of the desktop searching apparatus 100 according to the programs stored in the ROM 2502; a Random Access Memory (RAM) 2503 that stores therein various types of data that are required for controlling the desktop searching apparatus 100; a displaying device 2505 that displays the results of the processes described above and the like; a communication interface (I/F) 2507 that connects the desktop searching apparatus 100 to a network; an external storage device 2504 such as a hard disk; input device 2506; and a bus 2508 that connects the constituent elements to one another. It is acceptable to apply any commonly-used computer having the configurations as described above to the desktop searching apparatus 100.

The desktop search processing program executed by the desktop searching apparatus 100 according to each of the exemplary embodiments described above is provided as being recorded in a file in an installable format or in an executable format, on a computer-readable recording medium such as a Compact Disc Read-Only Memory (CD-ROM), a Flexible Disc (FD), a Compact Disc Recordable (CD-R), or a Digital Versatile Disc (DVD).

In this situation, the desktop search processing program is loaded into a main storage device, when being read from the recording medium and executed by the desktop searching apparatus 100 so that the functional elements explained as the software configuration above are generated within the main storage device.

Another arrangement is acceptable in which the desktop search processing program executed by the desktop searching apparatus 100 according to each of the exemplary embodiments described above is stored in a computer connected to a network such as the Internet and provided as being downloaded via the network. Further, yet another arrangement is acceptable in which the desktop search processing program executed by the desktop searching apparatus 100 according to each of the exemplary embodiments described above is provided or distributed via a network such as the Internet.

Further, yet another arrangement is acceptable in which the desktop search processing program according to each of the exemplary embodiments is provided as being incorporated in advance in the ROM or the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information searching apparatus comprising:
    a processor;
    a memory storing computer-executable instructions for execution by the processor;
    a document accumulating unit that accumulates documents;
    a character-string accumulating unit that accumulates a first character string contained in a document and used as a search key, a second character string contained in the document that includes the first character string, and a second character string attribute obtained by abstracting the second character string, wherein the first character string co-occurs with the second character string in the document, and the second character string attribute represents a category corresponding to the second character string;
    a storage unit that preliminarily stores the second character string attribute, together with additional classifying information corresponding to the second character string, the additional classifying information including a first character string attribute obtained by abstracting the first character string, and representing a category corresponding to the first character string;
    an attribute accumulating unit that accumulates a pattern for determining a first character string and a first character string attribute, the first character string corresponding to the first character string attribute;
    an input receiving unit that receives an input of the first character string;
    an obtaining unit that obtains the first character string attribute that is in correspondence with the pattern accumulated in the attribute accumulating unit, the pattern matching the inputted first character string;
    an attribute extracting unit that extracts, from the storage unit, a second character string attribute corresponding to the obtained first character string attribute;
    a character-string extracting unit that extracts, from the character-string accumulating unit, the second character string that corresponds to the extracted second character string attribute; and
    a searching unit that searches the document accumulating unit for one or more documents that contains both the input first character string and the extracted second character string.

2. The apparatus according to claim 1, further comprising:
    a character-string presenting unit that presents the second character string extracted by the character-string extracting unit to a user; and
    a character-string-selection receiving unit that receives a selection of the second character string from the second character string presented by the character-string presenting unit, wherein
    the searching unit searches for the one or more documents that contains both the first character string and the second character string, the selection of which is received by the character-string-selection receiving unit, from the document accumulating unit.

3. The apparatus according to claim 1, further comprising:
    a history storage unit that stores the first character string, the additional classifying information, and the second character string attribute in correspondence with one another, the first character string being selected by a user as a search key, and the second character string attribute being obtained from the second character string selected by the user as another search key;
    a history judging unit that judges whether a plurality of the additional classifying information stored in the history storage unit match one another; and
    a registering unit that registers in the storage unit the additional classifying information and the second character string attribute in correspondence with one another, when the history judging unit judges that a plurality of the additional classifying information match one another.

4. The apparatus according to claim 1, further comprising:
    a document-input processing unit that performs inputting the documents;
    a character string registering unit that registers, in the character-string accumulating unit, the first character string contained in the document on which the inputting is performed, and the second character string contained in the document in correspondence with one another; and a document registering unit that registers the document on which the inputting is performed in the document accumulating unit.

5. The apparatus according to claim 1, further comprising a search-result displaying unit that displays the document searched by the searching unit for every attribute of the documents.

6. The apparatus according to claim 1, wherein the storage unit further stores a narrowing-down condition used for narrowing down the documents in correspondence with one another, and the searching unit further searches for one of the documents that satisfies the narrowing-down condition.

7. An information searching method comprising:

accumulating documents in a document accumulating unit;

accumulating in a character-string accumulating unit, a first character string contained in a document and used as a search key, a second character string contained in the document that includes the first character string, and a second character string attribute obtained by abstracting the second character string, wherein the first character string co-occurs with the second character string in the document and the second character string attribute represents a category corresponding to the second character string;

storing in a storage unit preliminarily, the second character string attribute, together with additional classifying information corresponding to the second character string, the additional classifying information including a first character string attribute obtained by abstracting the first character string, and representing a category corresponding to the first character string;

accumulating in an attribute accumulating unit, a pattern for determining a first character string and a first character string attribute, the first character string corresponding to the first character string attribute receiving an input of the first character string;

obtaining the first character string attribute that is in correspondence with the pattern accumulated in the attribute accumulating unit, the pattern matching the inputted first character string;

extracting from the storage unit, a second character string attribute corresponding to the obtained first character string attribute;

extracting from the character-string accumulating unit, the second character string that corresponds to the extracted second character string attribute; and searching the document accumulating unit for one or more documents that contains both the input first character string and the extracted second character string.

8. The method according to claim 7, further comprising:

presenting the extracted second character string to a user; and receiving a selection of the second character string from the presented second character string, wherein the one or more documents containing both the first character string and the selected second character string are searched from the document accumulating unit.

9. The method according to claim 7, further comprising:

storing the first character string, the additional classifying information, and the second character string attribute in correspondence with one another in a history storage unit, the first character string being selected by a user as a search key, and the second character string attribute being obtained from the second character string selected by the user as another search key;

judging whether a plurality of the additional classifying information stored in the history storage unit match one another; and registering in the storage unit the additional classifying information and the second character string attribute in correspondence with one another, when the plurality of the additional classifying information is judged to match one another.

10. A computer readable storage medium including programmed instructions for searching information, wherein the instructions, when executed by a computer, cause the computer to perform:

accumulating documents in a document accumulating unit;

accumulating in a character-string accumulating unit, a first character string contained in a document and used as a search key, a second character string contained in the document that includes the first character string, and a second character string attribute obtained by abstracting the second character string, wherein the first character string co-occurs with the second character string in the document and the second character string attribute represents a category corresponding to the second character string;

storing in a storage unit preliminarily, the second character string attribute, together with additional classifying information corresponding to the second character string, the additional classifying information including a first character string attribute obtained by abstracting the first character string, and representing a category corresponding to the first character string;

accumulating in an attribute accumulating unit, a pattern for determining a first character string and a first character string attribute, the first character string corresponding to the first character string attribute receiving an input of the first character string;

obtaining the first character string attribute that is in correspondence with the pattern accumulated in the attribute accumulating unit, the pattern matching the inputted first character string;

extracting from the storage unit, a second character string attribute corresponding to the obtained first character string attribute;

extracting from the character-string accumulating unit, the second character string that corresponds to the extracted second character string attribute; and searching the document accumulating unit for one or more documents that contains both the input first character string and the extracted second character string.

11. The computer readable storage medium according to claim 10, wherein the instructions cause the computer to further perform:

presenting the extracted second character string to a user; and receiving a selection of the second character string from the presented second character string, wherein the one or more documents containing both the first character string and the selected second character string are searched from the document accumulating unit.

12. The computer readable storage medium according to claim 10, wherein the instructions cause the computer to further perform:

storing the first character string, the additional classifying information, and the second character string attribute in correspondence with one another in a history storage unit, the first character string being selected by a user as a search key, and the second character string attribute being obtained from the second character string selected by the user as another search key;

judging whether a plurality of the additional classifying information stored in the history storage unit match one another; and registering in the storage unit the additional classifying information and the second character string attribute in correspondence with one another, when the plurality of the additional classifying information is judged to match one another.

\* \* \* \* \*